(12) United States Patent
Masato

(10) Patent No.: US 9,705,350 B2
(45) Date of Patent: Jul. 11, 2017

(54) POWER STORAGE SYSTEM, POWER STORAGE CONTROL DEVICE, AND POWER STORAGE CONTROL METHOD

(71) Applicant: Sony Corporation, Tokyo (JP)

(72) Inventor: Tsuyoshi Masato, Kanagawa (JP)

(73) Assignee: Sony Corporation, Tokyo (JP)

( * ) Notice: Subject to any disclaimer, the term of this patent is extended or adjusted under 35 U.S.C. 154(b) by 389 days.

(21) Appl. No.: 14/467,639

(22) Filed: Aug. 25, 2014

(65) Prior Publication Data

US 2015/0061573 A1 Mar. 5, 2015

(30) Foreign Application Priority Data

Sep. 2, 2013 (JP) .................................. 2013-181112

(51) Int. Cl.
*H02J 7/00* (2006.01)
*H01M 10/44* (2006.01)
*H01M 10/42* (2006.01)
*H01M 10/48* (2006.01)
*H01M 10/46* (2006.01)

(52) U.S. Cl.
CPC ........... *H02J 7/007* (2013.01); *H01M 10/425* (2013.01); *H01M 10/441* (2013.01); *H01M 10/48* (2013.01); *H02J 7/0021* (2013.01); *H02J 7/0026* (2013.01); *H01M 10/46* (2013.01); *H02J 7/0042* (2013.01); *H02J 7/0052* (2013.01); *H02J 2007/0049* (2013.01)

(58) Field of Classification Search
USPC .................. 320/107, 108, 126, 136, 116
See application file for complete search history.

(56) References Cited

U.S. PATENT DOCUMENTS

| | | | | |
|---|---|---|---|---|
| 5,825,155 A | * | 10/1998 | Ito | G01R 19/16542 320/118 |
| 5,969,505 A | * | 10/1999 | Okamura | H02J 7/345 320/122 |
| 6,583,603 B1 | * | 6/2003 | Baldwin | G01R 31/3648 320/121 |
| 8,441,228 B2 | * | 5/2013 | Brabec | B60L 11/1861 180/65.21 |
| 9,331,497 B2 | * | 5/2016 | Beaston | H01M 10/4207 |
| 2002/0014880 A1 | * | 2/2002 | McAndrews | H02J 7/0013 320/134 |
| 2006/0158935 A1 | * | 7/2006 | Chan | G11C 7/062 365/185.17 |
| 2012/0262121 A1 | * | 10/2012 | Kuo | H02J 7/0019 320/126 |

(Continued)

FOREIGN PATENT DOCUMENTS

JP 2006-345660 A 12/2006

*Primary Examiner* — Brian Ngo
(74) *Attorney, Agent, or Firm* — Sheridan Ross P.C.

(57) ABSTRACT

There is provided a power storage system including at least two battery units mutually connected in parallel, the battery units each including at least one cell and at least one monitor device configured to monitor a charge state, at least one battery charger configured to supply charge current to each of the battery units, and at least one power storage control device configured to control a charge current value that is supplied to each of the battery units. The power storage control device is configured to decrease the charge current value in accordance with the charge state of each of the battery units.

10 Claims, 16 Drawing Sheets

(56) References Cited

U.S. PATENT DOCUMENTS

| | | | | |
|---|---|---|---|---|
| 2013/0002200 A1* | 1/2013 | Kobayashi | ............ | H02J 7/0081 320/112 |
| 2013/0059182 A1* | 3/2013 | Komatsu | ............. | H01M 2/1072 429/93 |
| 2013/0260196 A1* | 10/2013 | Takahashi | ........... | H01M 10/425 429/90 |
| 2014/0017528 A1* | 1/2014 | Uehara | ................ | H01M 2/202 429/61 |
| 2014/0021925 A1* | 1/2014 | Asakura | ................ | B60L 3/0046 320/126 |
| 2015/0035492 A1* | 2/2015 | Nomura | .............. | H01M 10/425 320/126 |
| 2015/0054467 A1* | 2/2015 | Takano | ................ | H01M 10/48 320/136 |
| 2016/0043580 A1* | 2/2016 | Rush, Jr. | ............... | H02J 7/0021 320/101 |

* cited by examiner

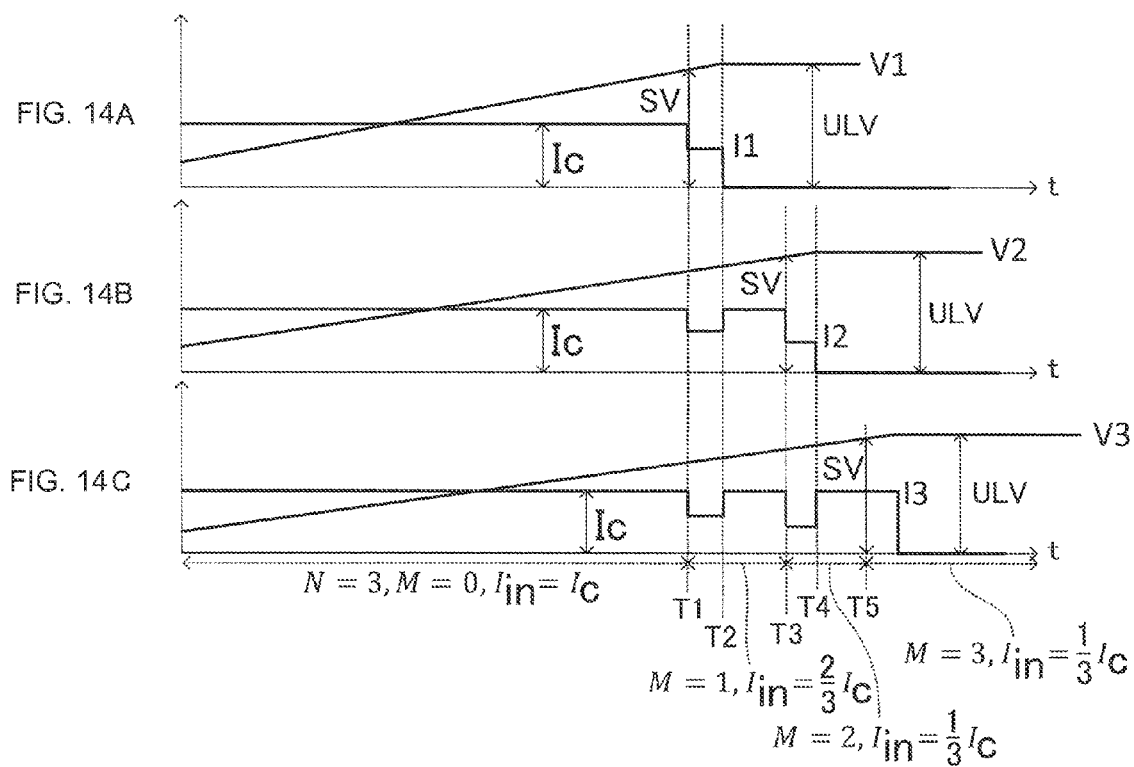

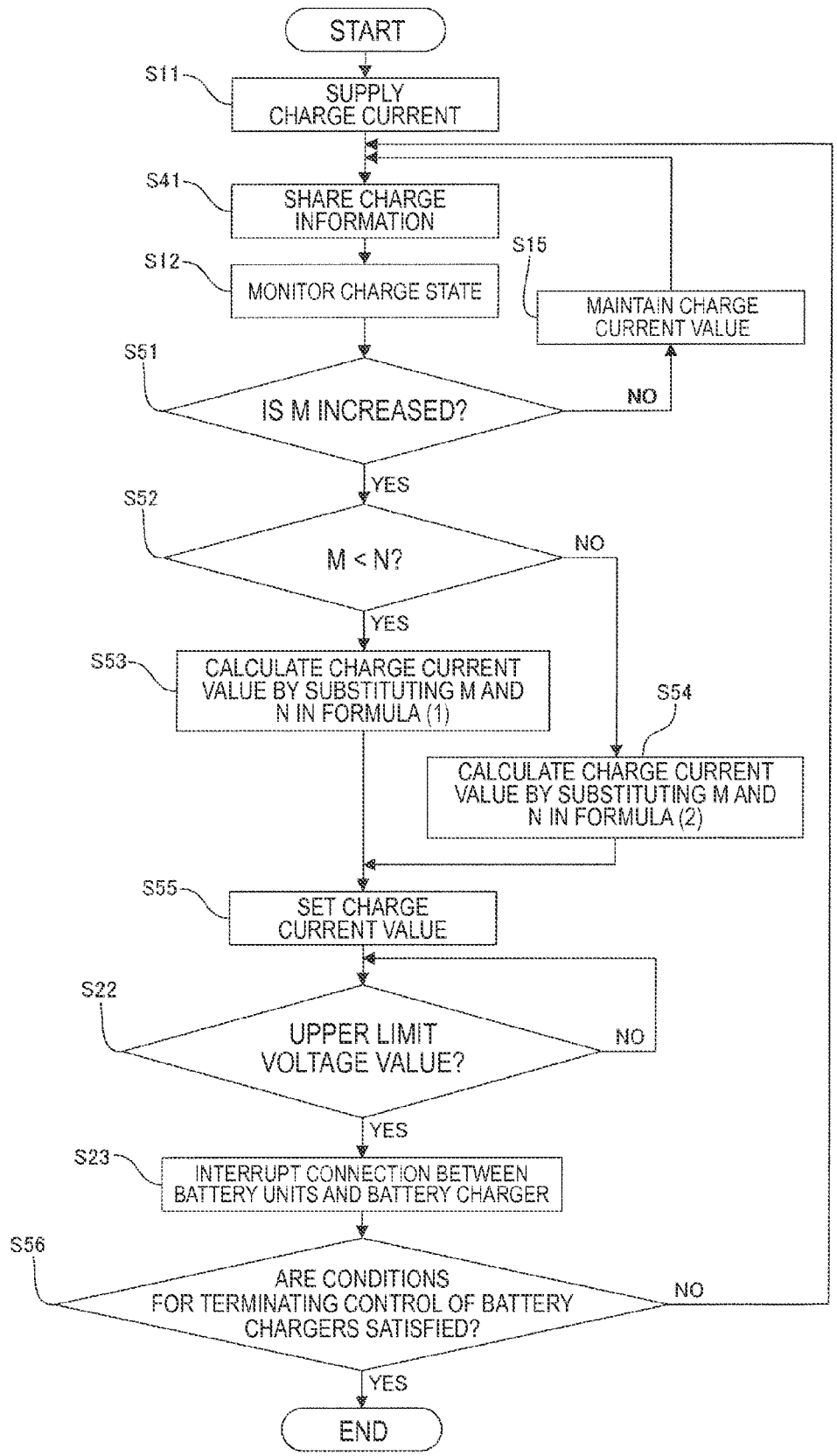

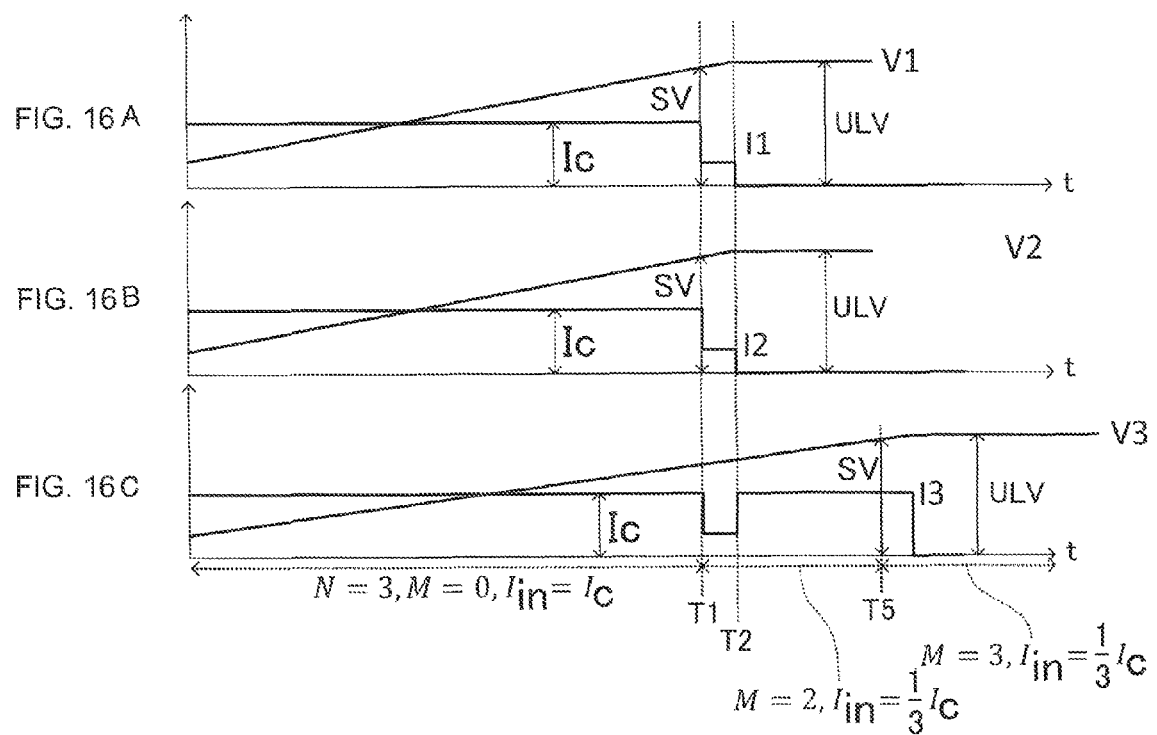

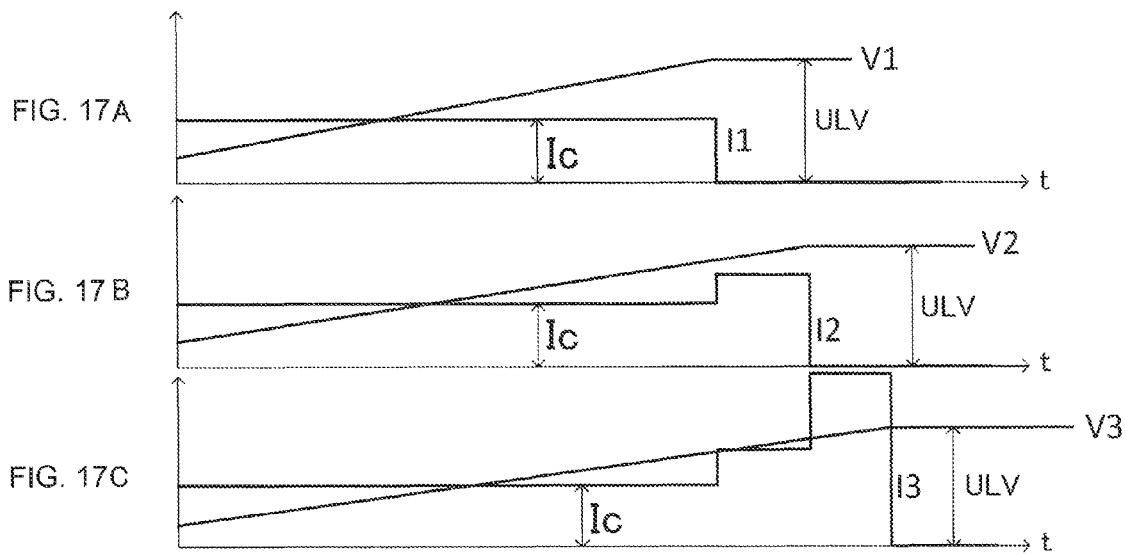

POWER STORAGE SYSTEM, POWER STORAGE CONTROL DEVICE, AND POWER STORAGE CONTROL METHOD

CROSS REFERENCE TO RELATED APPLICATIONS

This application claims the benefit of Japanese Priority Patent Application JP 2013-181112 filed Sep. 2, 2013, the entire contents of which are incorporated herein by reference.

BACKGROUND

The present disclosure relates to a power storage system, a power storage control device, and a power storage control method. More particularly, the present disclosure relates to a power storage system, power storage control device, and power storage control method that causes a cell to be charged.

In the related art, there has been proposed a technique related to a power source device in which a plurality of secondary batteries are connected in parallel. For example, JP 2006-345660A proposes a technique of providing, in a power source device in which a plurality of series connection battery blocks are connected in parallel, the plurality of series connection battery blocks including a plurality of chargeable and dischargeable secondary batteries connected in series, a constant current control circuit for each of the series connection battery blocks. According to the power source device disclosed in JP 2006-345660A, when the series connection battery blocks are connected in parallel, a series connection battery block having a small difference in potential can be prevented from being damaged by inrush current.

SUMMARY

In a case in which a plurality of secondary batteries are connected in parallel and each of the secondary batteries are actually charged, overcurrent of charge current may occur.

The present disclosure provides a power storage system, power storage control device, and power storage control method that can prevent overcurrent of charge current.

A power storage system according to an embodiment of the present disclosure includes at least two battery units mutually connected in parallel, the battery units each including at least one cell and at least one monitor device configured to monitor a charge state, at least one battery charger configured to supply charge current to each of the battery units, and at least one power storage control device configured to control a charge current value that is supplied to each of the battery units. The power storage control device is configured to decrease the charge current value in accordance with the charge state of each of the battery units. Here, "charge state" means the state of progress of charge (the same shall apply hereafter).

Each of the battery units may include an interruption device configured to interrupt connection with the battery charger in a case in which a voltage reaches an upper limit voltage value, and the power storage control device may decrease the charge current value in a case in which a voltage of any one of the battery units becomes a specific voltage value that is smaller than the upper limit voltage value.

In this case, until it is detected that the voltage of one of the battery units becomes the specific voltage value first, the power storage control device may keep causing the battery charger to supply a constant current, and after it is detected that the voltage of one of the battery units becomes the specific voltage value first, the power storage control device may adjust a current value that is supplied by the battery charger in a manner that the charge current value that is supplied to each of the battery units is set to be lower than or equal to the constant current value.

Further, the power storage system may include at least two power storage control devices, and the at least two power storage control devices may share charge information. In this case, the power storage system may further include a communication line that mutually connects the at least two power storage control devices, and the at least two power storage control devices may each be configured to mutually transmit and receive the charge information via the communication line. Further, a first power storage control device out of the at least two power storage control devices may be configured to acquire the charge information from the monitor device corresponding to the first power storage control device and transmit the charge information to a second power storage control device out of the at least two power storage control devices. Here, "charge information" means information indicating the charge state (the same shall apply hereafter).

Further, the power storage control device may perform adjustment of the charge current value in accordance with a number of the battery units having voltages that are higher than or equal to the specific voltage value. In this case, the power storage control device may perform the adjustment including decreasing the charge current value as the number of the battery units having voltages that are higher than or equal to the specific voltage value is larger. Here, "the adjustment including decreasing the charge current value" means any adjustment depending on conditions as long as the adjustment includes, as an example, decreasing the charge current value as the number of the battery units having voltages that are higher than or equal to the specific voltage value is larger (the same shall apply hereafter).

The power storage control device may perform the adjustment including decreasing the charge current value gradually as the number of the battery units having voltages that are higher than or equal to the specific voltage value increases. Here, "the adjustment including decreasing the charge current value gradually" means any adjustment depending on conditions as long as the adjustment includes, as an example, decreasing the charge current value gradually as the number of the battery units having voltages that are higher than or equal to the specific voltage value increases (the same shall apply hereafter).

A power storage control device according to another embodiment of the present disclosure includes a configuration configured to decrease a charge current value that is supplied to at least two battery units in accordance with a charge state of each of the battery units, the battery units being mutually connected in parallel and each including at least one cell.

A power storage control method according to another embodiment of the present disclosure includes decreasing a charge current value that is supplied to at least two battery units in accordance with a charge state of each of the battery units, the battery units being mutually connected in parallel and each including at least one cell.

According to one or more of embodiments of the present disclosure, it becomes possible to prevent overcurrent of charge current.

BRIEF DESCRIPTION OF THE DRAWINGS

FIGS. 14A to 14C are each a time chart showing an operation example of a power storage system according to a fifth embodiment of the present disclosure, FIG. 14A being a time chart corresponding to a first battery unit, FIG. 14B being a time chart corresponding to a second battery unit, FIG. 14C being a time chart corresponding to a third battery unit;

FIG. 15 is a flowchart showing an operation example of a power storage system according to the fifth embodiment of the present disclosure;

FIGS. 16A to 16C are each a time chart showing operation of a power storage system according to a modification example of the fifth embodiment of the present disclosure, FIG. 16A being a time chart corresponding to a first battery unit, FIG. 16B being a time chart corresponding to a second battery unit, FIG. 16C being a time chart corresponding to a third battery unit; and FIGS. 17A to 17C are each a time chart showing operation of a power storage system according to a comparative example of the fifth embodiment of the present disclosure, FIG. 17A being a time chart corresponding to a first battery unit, FIG. 17B being a time chart corresponding to a second battery unit, FIG. 17C being a time chart corresponding to a third battery unit.

DETAILED DESCRIPTION OF THE EMBODIMENT(S)

Figure 1:
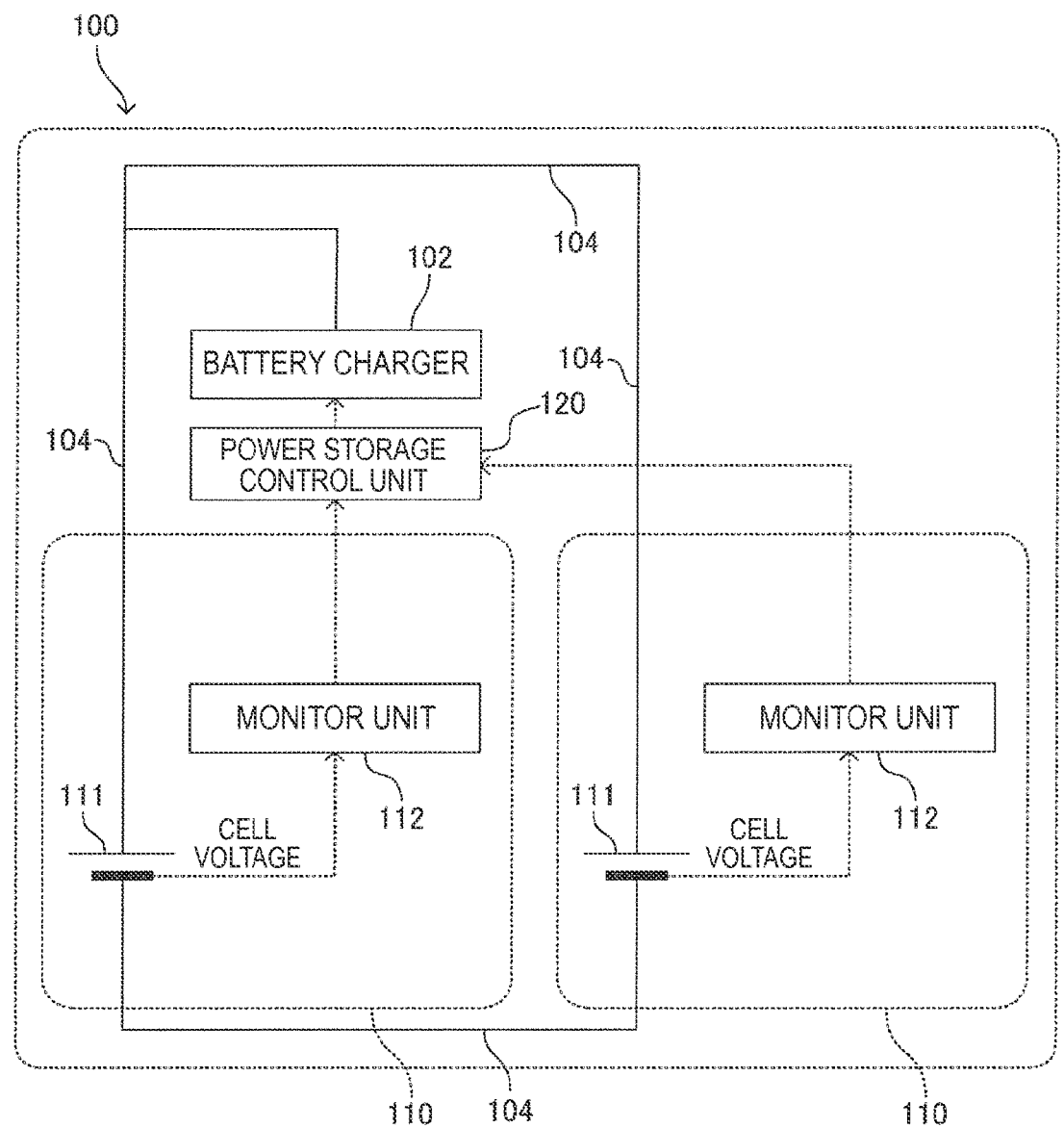
FIG. 1 schematically shows a configuration example of a power storage system according to a first embodiment of the present disclosure.

Hereinafter, preferred embodiments of the present disclosure will be described with reference to the appended drawings. Note that, the embodiments described below will show examples of typical embodiments of the present disclosure, and the scope of the present disclosure shall not be interpreted narrowly. Further, in this specification and the appended drawings, structural elements that have substantially the same function and structure are denoted with the same reference numerals, and repeated explanation of these structural elements is omitted. The description will be made in the following order.

1. First embodiment
(Example of a power storage system that decreases a charge current value in accordance with a charge state of each battery unit)
2. Modification example of first embodiment
(Example of a power storage system including a plurality of battery chargers and a plurality of power control units as an example of power storage control devices, in which a battery unit includes a plurality of cells)
3. Second embodiment
(Example of a power storage system including a switch control unit as an example of an interruption device)
4. Modification example of second embodiment
(Example of a power storage system including a plurality of battery chargers and a plurality of power storage control units)
5. Third embodiment
(Example of a power storage system using a constant current charge)
6. Fourth embodiment
(Example of a power storage system sharing charge information)
7. First modification example of fourth embodiment
(Example of a power storage system including a communication line)
8. Second modification example of fourth embodiment
(Example of a power storage system in which a battery unit includes a plurality of cells)
9. Third modification example of fourth embodiment
(Example of a power storage system including a plurality of power storage units)
10. Fifth embodiment
(Example of a power storage system adjusting a charge current value in accordance with the number of battery units having voltages that are higher than or equal to a specific voltage value)
11. Modification example of fifth embodiment
(Example of a power storage system coping with simultaneous termination of charge)

1. First Embodiment

Configuration Example of System

FIG. 1 schematically shows a whole configuration example of a power storage system 100 according to this embodiment. As shown in FIG. 1, the power storage system 100 includes a plurality of battery units 110, a battery charger 102, and a power storage control unit 120 as an example of a power storage control device according to an embodiment of the present disclosure.

[Battery Charger 102]

The battery charger 102 is connected to the battery units 110 via a power line 104. The battery charger 102 is also connected to a power source that is not shown. The battery charger 102 charges the battery units 110 using power supplied from the power source.

The battery charger 102 may charge the battery units 110 by supplying charge current having a set charge current value to the battery units 110. The battery charger 102 can be configured in various manners without limitation, and a variety of battery chargers that can adjust the charge current value can be used. For example, the battery charger 102 may be formed with an electronic device that adjusts the current value of the charge current flowing from the power supply side to the battery units 110 side, or the like. The electronic device may include an electronic circuit or the like. The electronic circuit may include a semiconductor element or the like. The semiconductor element may be a transistor or the like. The charge current value may be set by the application of a signal to the electronic device, such as the application of base current to a bipolar transistor or the application of a gate voltage to a unipolar transistor, or the like. The power supply may be a solar battery, an aerogenerator, a power plant, or the like. Alternatively, the battery charger 102 itself may have a power generating function.

[Battery Units 110]

The battery units 110 are mutually connected in parallel via the power line 104. The number of the battery units 110 is not limited to two as shown in FIG. 1, and may be selected as appropriate in accordance with an output to be generated.

As shown in FIG. 1, each of the battery units 110 includes a cell 111 which can charge and discharge electricity and a monitor unit 112 as an example of a monitor device.

[Cell 111]

The cell 111 is connected to the battery charger 102 via the power line 104. The cell 111 is disposed such that an upstream of the direction of charge current flow to the cell 111 is a positive electrode and a downstream thereof is a negative electrode. When charging electricity, the cell 111 stores the charge current supplied from the battery charger 102 as charge. When discharging electricity, the cell 111 can supply the stored charge to a load as discharge current. The type of the cell 111 is not limited to a particular type, and a lithium ion secondary battery or the like can be preferably employed, for example. The use of a lithium ion secondary battery can increase the energy density and output of the cell 111, can suppress the self-discharge of the cell 111, or can increase the lifetime of the cell 111.

[Monitor Unit 112]

The monitor unit 112 is connected to the cell 111. The monitor unit 112 monitors the charge state of the battery units 110. The monitoring of the charge state may be realized by detecting the physical amount indicating the charge state electrically from the battery units 110, arithmetic of parameters indicating the charge state on the basis of detection results of the physical amount, and the like. For example, the monitor unit 112 may monitor the charge state by continuously detecting the sum of voltages of the battery units 110, i.e., voltages (hereinafter referred to as cell voltages) of the cells 111 included in the battery units 110. FIG. 1 schematically shows the state where the cell voltages are detected by the monitor unit 112, and the detection results of the cell voltage are reflected on the detection results of voltages of the battery units 110. The scope of the present disclosure includes not only voltages of the battery units 110 but other parameters that monitor the state of progress of charge of the battery units 110, i.e., values corresponding to the degree of the progress. For example, the monitor unit 112 may monitor the charge state by continuous arithmetic of the ratio of a remaining capacity to a full charge capacity of the battery units 110.

The monitor unit 112 may monitor the degradation state, i.e., the degree of degradation of the battery units 110, in addition to the charge state. The monitoring of the degradation state may be realized by electrically detecting the physical amount indicating the degradation state from the battery units 110, arithmetic of parameters indicating the degradation state on the basis of the detection results of the physical amount, and the like. For example, the monitor unit 112 may monitor the degradation state by detecting the discharge voltage of the battery units 110, arithmetic of the ratio of full charge capacity after degradation to the initial full charge capacity of the battery units 110.

The monitor unit 112 outputs the monitor results to the power storage control unit 120. The monitor unit 112 may be formed with an electronic device or the like. The electronic device may include an electronic circuit or the like. The electronic circuit may include an integrated circuit or the like.

[Power Storage Control Unit 120]

The power storage control unit 120 controls the operation of the battery charger 102 so as to control the charge current value that is supplied from the battery charger 102 to each of the battery units 110. The power storage control unit 120 sets the charge current value with respect to the battery charger 102 so as to cause charge current having the set charge current value to be supplied.

In some cases where the battery units 110 which are connected in parallel are actually charged, the charge current flowing to the battery units 110 may become overcurrent depending on variations in the charge state of the battery units 110. In order to prevent such overcurrent, for example, the charge current value is controlled as described below in this embodiment.

The power storage control unit 120 decreases the charge current value that is supplied to the battery units 110 in accordance with the charge state of each of the battery units 110. The power storage control unit 120 may decrease the charge current value that is supplied to the battery units 110 by decreasing the charge current value that is set for the battery charger 102. The power storage control unit 120 may acquire the charge state from the monitor unit 112.

The power storage control unit 120 may be formed with an electronic device or the like. The electronic device may include an arithmetic processing device such as a central processing unit (CPU) or a micro-processing unit (MPU), a memory device such as random access memory (RAM) or read only memory (ROM), and the like. The ROM may store a program for realizing the function of the power storage control unit 120, i.e., software or data. The arithmetic processing device may realize the function of the power storage control unit 120 by executing a program stored in the ROM. The RAM may be used as a working area of the arithmetic processing device or the like. However, there is no limitation to such a configuration.

Operation Example of System

Figure 2:
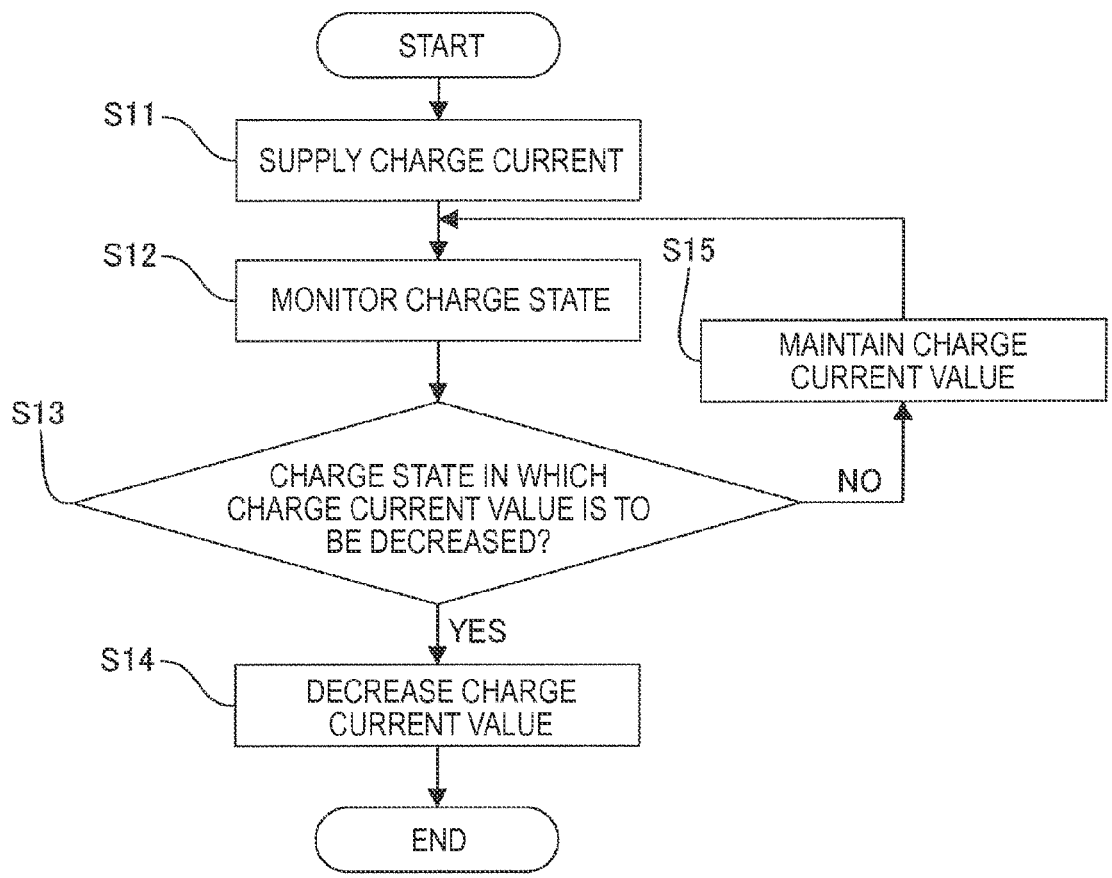
FIG. 2 is a flowchart showing an operation example of a power storage system according to the first embodiment of the present disclosure.

FIG. 2 is a flowchart showing an operation example of the power storage system 100 according to this embodiment. The operation example shown in FIG. 2 includes an embodiment of a power storage control method according to an embodiment of the present disclosure. However, the power storage control method according to an embodiment of the present disclosure may be realized by using a different configuration from the power storage system 100.

For convenience of explanation, at an initial state in FIG. 2, it is assumed that the charge current value is set for the battery charger 102 by the power storage control unit 120.

From the initial state, first, in step 11 (S11) in FIG. 2, the battery charger 102 supplies charge current of the set charge current value to the battery units 110, and thereby the charge of the battery units 110 starts.

Next, in step 12 (S12), the monitor unit 112 monitors the charge state.

Next, in step 13 (S13), the power storage control unit 120 determines whether or not the current charge state is a charge state in which the charge current value of the battery charger 102 is to be decreased. Then, in a case in which the determination result is affirmative in the step 13 (S13), the process goes to step 14 (S14); in a case in which the determination result is negative, the process goes to step 15 (S15).

Here, in a case in which the process goes to the step 14 (S14), the power storage control unit 120 decreases the charge current value of the battery charger 102. After that, the process is terminated or returned to the step 12 (S12) as necessary. The termination of the process may include the termination of the operation of the battery charger 102.

On the other hand, in a case in which the process goes to the step 15 (S15), the charge current value is maintained and the process goes back to the step 12 (S12).

As described above in detail, according to the power storage system 100 of this embodiment, the power storage control unit 120 decreases the charge current value that is supplied from the battery charger 102 to each of the battery units 110 in accordance with the charge state of each of the battery units 110. Thus, overcurrent of charge current can be effectively prevented.

2. Modification Example of First Embodiment

Figure 3:
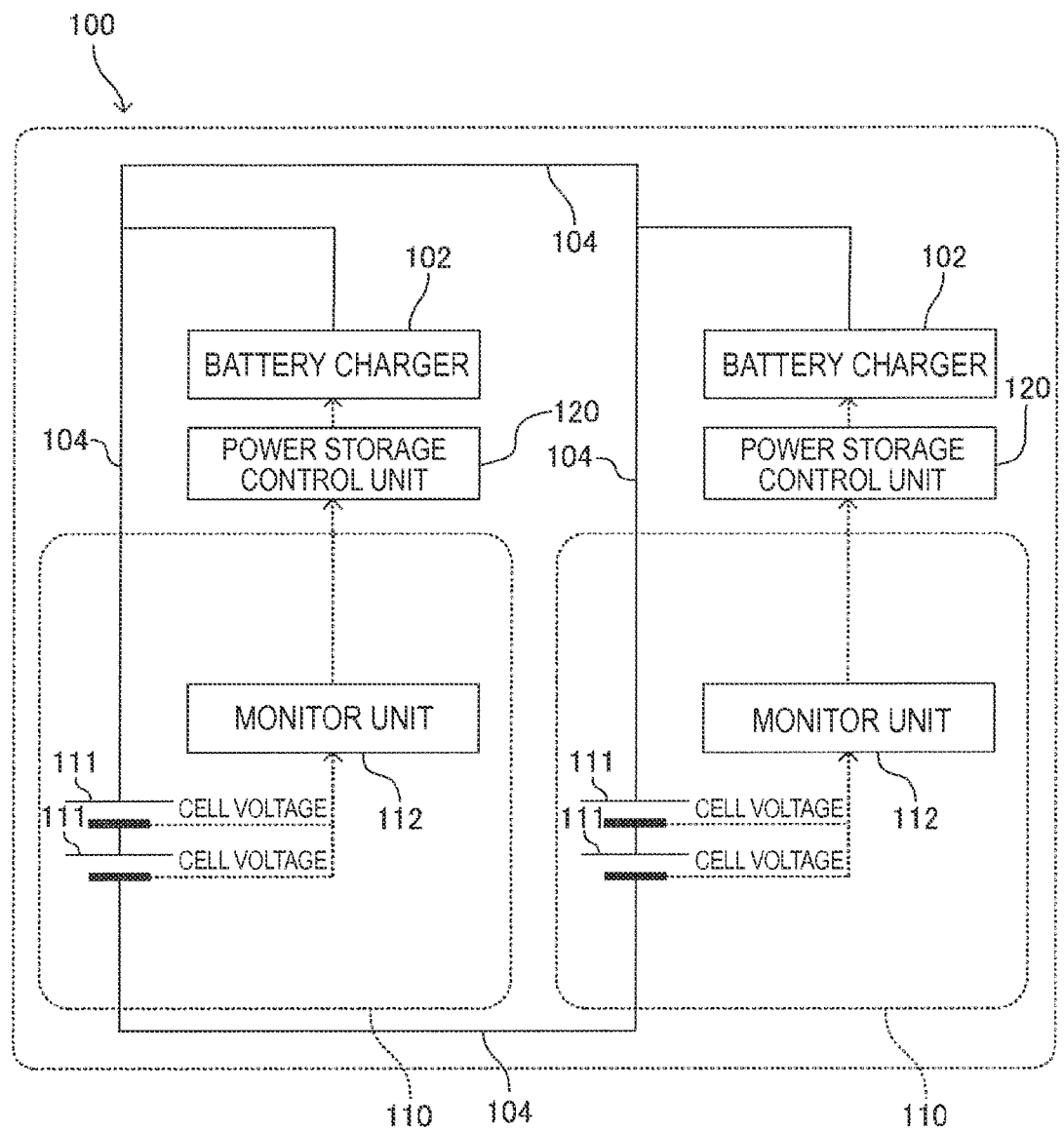
FIG. 3 schematically shows a configuration of a power storage system according to a modification example of the first embodiment of the present disclosure.

FIG. 3 schematically shows a whole configuration of the power storage system 100 according to a modification example of this embodiment. The power storage system 100 according to this modification example is different from the power storage system 100 shown in FIG. 1 in dispositions of the cell 111, the battery charger 102, and the power storage control unit 120.

Specifically, as shown in FIG. 3, in the storage system 100 according to this modification example, each of the battery units 110 includes a plurality of the cells 111. The number of cells in each of the battery units 110 may be the same or different from each other.

Further, as shown in FIG. 3, the power storage system 100 according to this modification example includes a plurality of the battery chargers 10 and a plurality of the power storage control units 120 for the respective battery units 110. In this modification example, each of the battery chargers 102 charges the corresponding battery unit 110. Further, in this modification example, each of the power storage control units 120 decreases the charge current value which is to be set for the corresponding battery charger 102 in accordance with the charge state of the corresponding battery unit 110 and the charge state of the other battery unit 110. The other configuration and operation are fundamentally the same as those of the power storage system 100 shown in FIG. 1.

According to this modification example, it is possible to produce the same effects as those of the power storage system 100 shown in FIG. 1, and to perform control of the charge current value quickly for each of the battery units 110. Further, because the plurality of cells 111 are provided for each of the battery units 110, even when variations in the charge state are likely to be generated in the battery units 110, overcurrent can be effectively prevented.

3. Second Embodiment

Configuration Example of System

Figure 4:
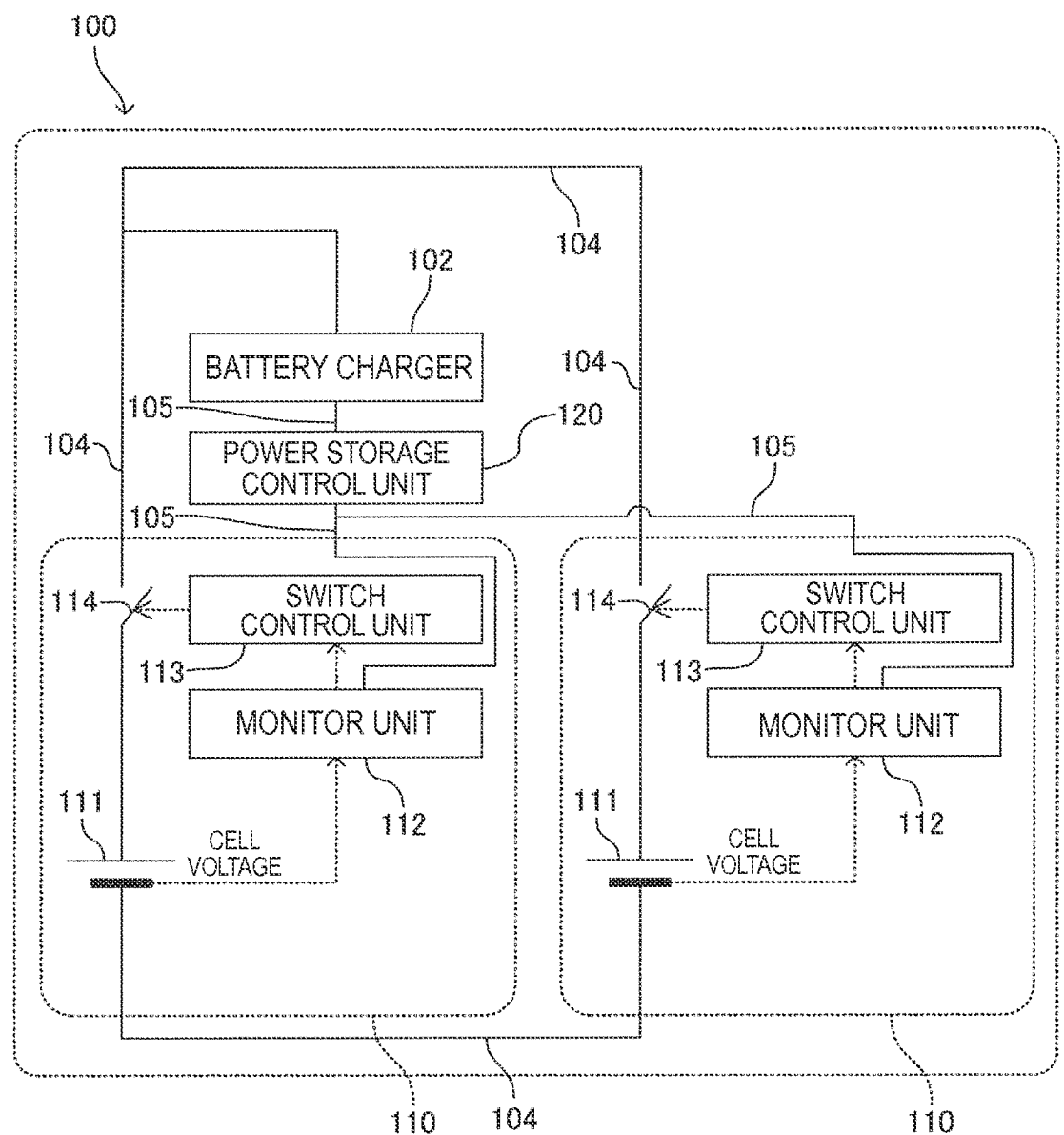
FIG. 4 schematically shows a configuration example of a power storage system according to the second embodiment of the present disclosure.

FIG. 4 schematically shows a whole configuration example of the power storage system 100 according to this embodiment. As shown in FIG. 4, the power storage system 100 according to this embodiment is different from the power storage system 100 shown in FIG. 1 in that each of the battery units 110 includes a switch control unit 113 and a switch 114 as an example of an interruption device. Further, the power storage system 100 according to this embodiment is different from the power storage system 100 shown in FIG. 1 also in that the power storage control unit 120 can decrease the charge current value of the battery charger 102 at timing involving the operation of the switch 114. Further, in the power storage system 100 of this embodiment, the power storage control unit 120 is connected to the monitor units 112 and the battery charger 102 via a signal line 105. The other configuration is fundamentally the same as that of the power storage system 100 in FIG. 1.

[Battery Units 110]
[Switch 114]

The switch 114 is disposed at a position closer to the battery charger 102 than the cell 111 is on the power line 104. The switch 114 is set to a selected operation state. The operation state includes an on state and an off state. The on state is a state in which the switch 114 closes an electric circuit between the battery charger 102 and the cell 111. The off state is a state in which the switch 114 opens the electric circuit between the battery charger 102 and the cell 111. In the on state, the charge or discharge of the cell 111 by the battery charger 102 is permitted. In the off state, the charge and the discharge are disabled. The switch 114 may be configured in various manners without limitation; for example, the switch 114 may be configured by a semiconductor element or the like. The semiconductor element may be a transistor or the like. The transistor may be a field effect transistor or the like. The use of a field effect transistor can suppress power consumption.

[Switch Control Unit 113]

The switch control unit 113 is connected to the monitor unit 112 and the switch 114. The switch control unit 113 selects the operation state of the switch 114. For example, the switch control unit 113 switches the switch 114 from the on state to the off state or from the off state to the on state by applying an electric signal to the switch 114.

In a case in which the voltages of the battery units 110 reaches an upper limit voltage value, the switch control unit 113 functions as an interruption device and interrupts the connection between the battery units 110 and the battery charger 102. Thus, it is possible to prevent overcurrent from flowing to the battery units 110. The switch control unit 113 may detect that the voltages of the battery units 110 reaches the upper limit voltage value on the basis of the charge state acquired from the monitor unit 112. The switch control unit 113 may interrupt the connection between the battery units 110 and the battery charger 102 by switching the switch 114 from the on state to the off state.

The electric signal applied from the switch control unit 113 to the switch 114 may be base current of a bipolar transistor or the like, or a gate voltage of a unipolar transistor or the like. The unipolar transistor may be a field effect transistor, as described above. The switch control unit 113 may be formed with an electronic device or the like. The electronic device may include an electronic circuit or the like. The electronic circuit may include an integrated circuit or the like. The switch control unit 113 may be configured to be integrated with the monitor unit 112 by, for example, being disposed over the same battery protection circuit, or may be configured separately from the monitor unit 112. The integrated configuration of the switch control unit 113 and the monitor unit 112 can decrease the number of parts and downsize the circuit.

[Power Storage Control Unit 120]

The charge of the battery units 110 may be terminated at different timing depending on the variation in the charge state of the battery units 110. Specifically, in some cases, the voltage of one of the battery units 110 may reach the upper limit voltage value earlier than the voltage of the other battery unit 110, and that the connection with the battery charger 102 may be interrupted by the operation of the switch 114. In this case, the charge current of the battery charger 102 loses the destination due to the interruption and flows to the other battery unit 110, which is being charged, as cross current. Thus, the charge current of the battery unit 110, which is being charged, may become overcurrent in some cases. In order to prevent such overcurrent, for example, the charge current value is controlled as described below in this embodiment.

In a case in which the voltage of the battery units 110 becomes a specific voltage value which is lower than the upper limit voltage value, the power storage control unit 120 decreases the charge current value. The power storage control unit 120 may detect that the battery units 110 has the specific voltage value on the basis of the charge state acquired from the monitor unit 112. The specific voltage value can be set in various manners without limitation. For example, a preferable value which is smaller than the upper limit voltage value and is close to the upper limit voltage value may be set as the specific voltage value. The specific voltage value may be a voltage value by which it is regarded that the charge is immediately before termination, that is, immediately before the switch of the switch 114 to the off state, from the relation with the upper limit voltage value.

Operation Example of System

Figure 5:
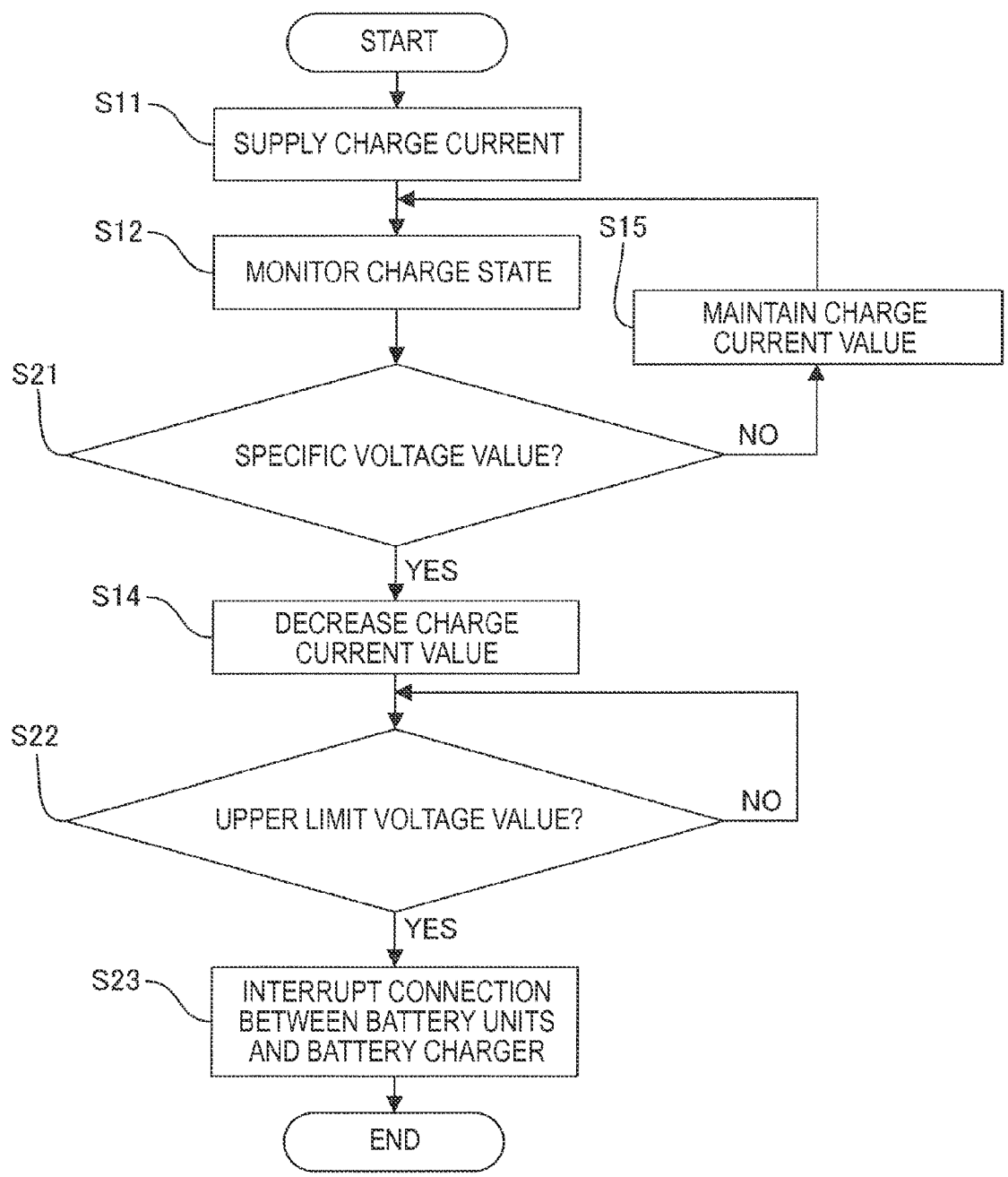
FIG. 5 is a flowchart showing an operation example of a power storage system according to the second embodiment of the present disclosure.

FIG. 5 is a flowchart showing an operation example of the power storage system 100 according to this embodiment. The operation example shown in FIG. 5 includes an embodiment of a power storage control method according to an embodiment of the present disclosure.

The operation example according to this embodiment is different from that according to the first embodiment in that step 21 (S21) is executed as a specific example of the step 13 (S13) shown in FIG. 2 instead of the step 13 (S13), and in that step 22 (S22) and step 23 (S23) are performed after the step 14 (S14).

In the step 21 (S21), the power storage control unit 120 determines whether or not the voltage of the battery units 110 becomes the specific voltage value. Then, in a case in which the determination result is affirmative in the step 21 (S21), the process goes to the step 14 (S14); in a case in which the determination result is negative, the process goes to the step 15 (S15).

In the step 22 (S22), the switch control unit 113 determines whether or not the voltage of the battery units 110 has reached the upper limit voltage value. Then, in a case in which the determination result is affirmative in the step 22 (S22), the process goes to the step 23 (S23); in a case in which the determination result is negative, the process is returned to the step 22 (S22).

In the step 23 (S23), the switch control unit 113 switches the switch 114 from the on state to the off state, thereby interrupting the connection between the battery units 110 and the battery charger 102. After that, the process is terminated or returned to the step 12 (S12) as necessary.

According to this embodiment, it is possible to produce the same effects as those of the power storage system 100 shown in FIG. 1, and to decrease the charge current value of the battery charger 102 in advance before the generation of cross current due to the interruption of the battery charger 102. Accordingly, overcurrent can be prevented from occurring.

4. Modification Example of Second Embodiment

Figure 6:
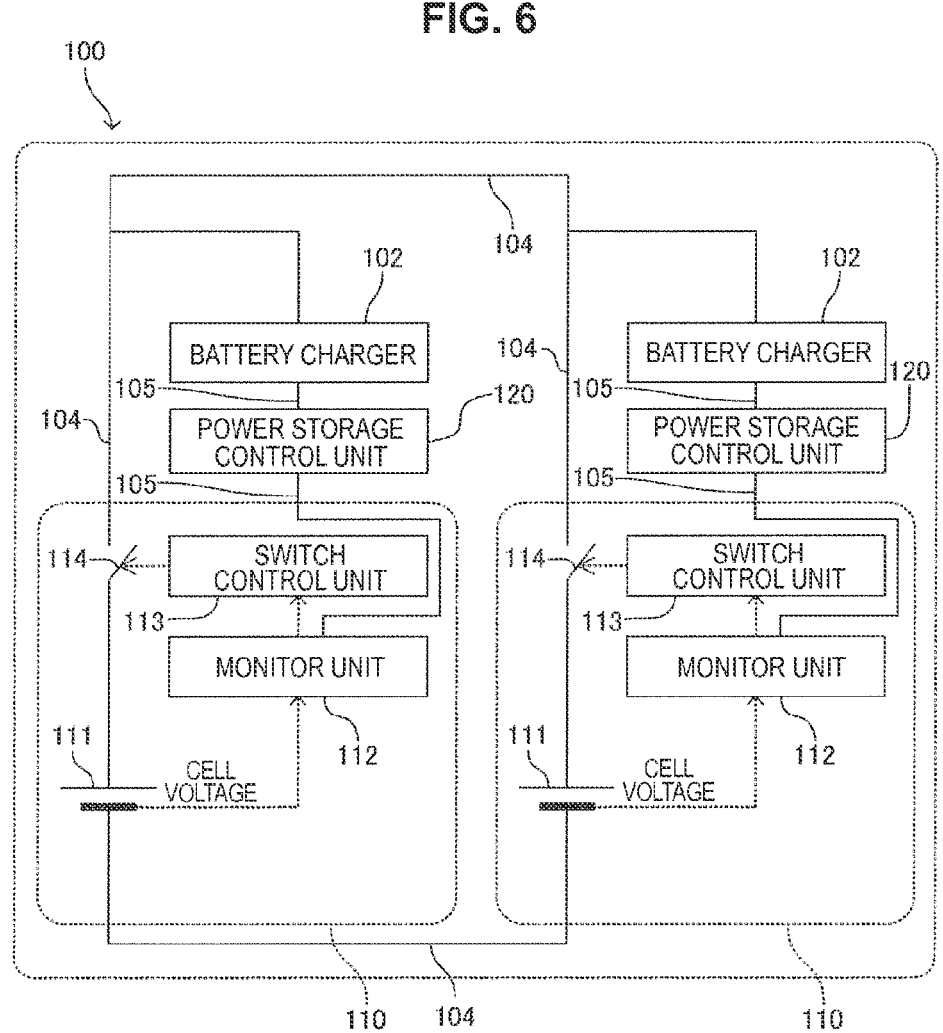
FIG. 6 schematically shows a configuration of a power storage system according to a modification example of the second embodiment of the present disclosure.

FIG. 6 schematically shows a whole configuration of the power storage system 100 according to a modification example of this embodiment. The power storage system 100 according to this modification example is different from the power storage system 100 shown in FIG. 4 in that a plurality of the battery chargers 102 and a plurality of the power storage control units 120 are provided for the respective battery units 110. In this modification example, each of the battery chargers 102 charges the corresponding battery unit 110. Further, in this modification example, in a case in which the voltage of any one of the corresponding battery unit 110 and the other battery unit 110 reaches the specific voltage value, each of the power storage control units 120 decreases the charge current value which is set for the corresponding battery charger 102. The other configuration and operation are fundamentally the same as those of the power storage system 100 shown in FIG. 4.

According to this modification example, it is possible to produce the same effects as those of the power storage system 100 shown in FIG. 4, and to control the charge current value quickly for each of the battery units 110.

5. Third Embodiment

Figure 7:
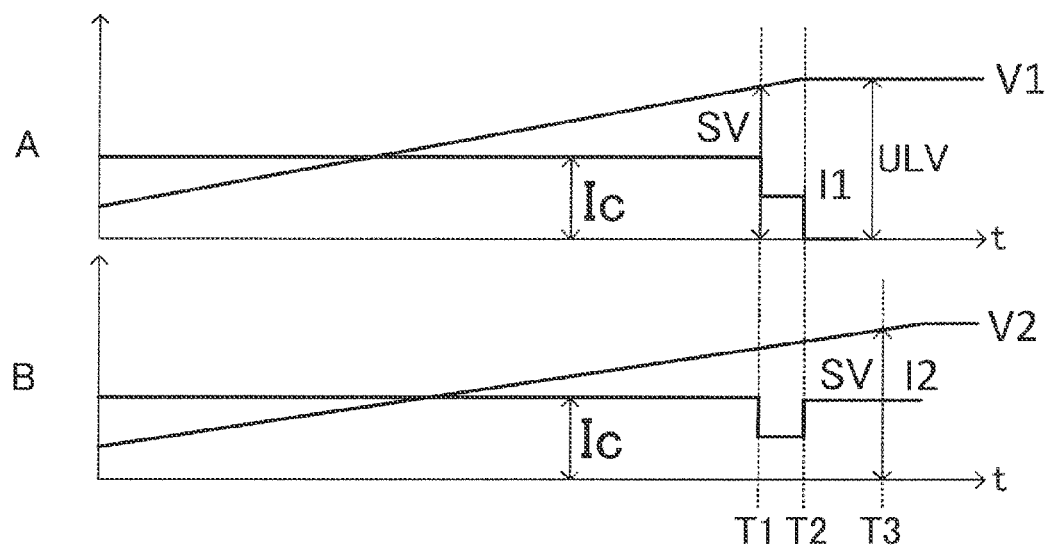
FIGS. 7A and 7B are each a time chart showing an operation example of a power storage system according to a third embodiment of the present disclosure, FIG. 7A being a time chart corresponding to a first battery unit, FIG. 7B being a time chart corresponding to a second battery unit.

FIGS. 7A and 7B are each a time chart showing an operation example of the power storage system 100 according to this embodiment. Note that the time charts shown in FIGS. 7A and 7B show two battery units 110. The horizontal axis in FIGS. 7A and 7B represents time (t) and the vertical axis in FIGS. 7A and 7B represents charge current values (I1 and I2) flown in the respective battery units 110 and voltages (V1 and V2) of the respective battery units 110. In the following description, the battery unit 110 corresponding to the time chart in FIG. 7A is defined as a first battery unit 110 and the battery unit 110 corresponding to the time chart in FIG. 7B is defined as a second battery unit 110.

The power storage system 100 according to this embodiment is obtained by adding control for the power storage control unit 120 to the power storage system 100 according to the second embodiment.

Specifically, the power storage control unit 120 keeps causing the battery charger 102 to supply a constant current value until it is detected that the voltage of one of the battery units 110 becomes the specific voltage value first. In the example shown in FIGS. 7A and 7B, the one of the battery units 110 having the specific voltage value first is the first battery unit 110 (FIG. 7A), and the constant current value (Ic) is kept being supplied to the first and second battery units 110 until the voltage of the battery unit 110 becomes the specific voltage value (SV).

Then, after it is detected that the voltage of the one of the battery units 110 becomes the specific voltage value first, the power storage control unit 120 adjusts the current value supplied by the battery charger 102 and sets the charge current value supplied to each of the battery units 110 to be lower than or equal to the constant current value. In the example shown in FIGS. 7A and 7B, after time T1 when the voltage of the first battery unit 110 reaches the specific voltage value, the charge current value of the battery charger 102 is made smaller than the constant current value (Ic). Thus, after the voltage of the first battery unit 110 reaches an upper limit voltage value (ULV) and electricity from the battery charger 102 is interrupted at time T2, the charge current value (I2) of the second battery unit 110 can be maintained to be lower than or equal to the constant current value (Ic).

Here, as long as the current value is decreased as an example, the current value supplied by the battery charger 102 may be adjusted in various manners other than the decrease in the current value. Specifically, in a case in which the charge current value of the battery unit 110 can be controlled to be lower than or equal to the constant current value including cross current from the other battery unit 110, the scope of the adjustment of the current value according to an embodiment of the present disclosure includes adjustment including the maintenance of the current value and/or the increase in the current value. In other words, as long as overcurrent is not generated, for example, the scope of the present disclosure includes the maintenance of the current value and the increase in the current value so as to sufficiently secure charge current supplied to the battery units 110. When the charge current value is sufficiently secured, the time for charging may be shortened. In the example shown in FIG. 7, in a case in which the voltage of the second battery unit 110 reaches the specific voltage value (SV) at time T3, the charge current value of the battery charger 102 is maintained to be at the value that is decreased at time T1. Thus, from time T3 to the interruption of connection between the second battery unit 110 and the battery charger 102, the charge current value (I2) of the second battery unit 110 is maintained at the value held between time T2 and time T3.

According to this embodiment, it is possible to produce the same effects as those of the power storage system 100 shown in FIG. 4 or FIG. 6 and to prevent the generation of overcurrent in a case in which the constant current charge is performed.

6. Fourth Embodiment

[Power Storage Control Unit 120]

Figure 8:
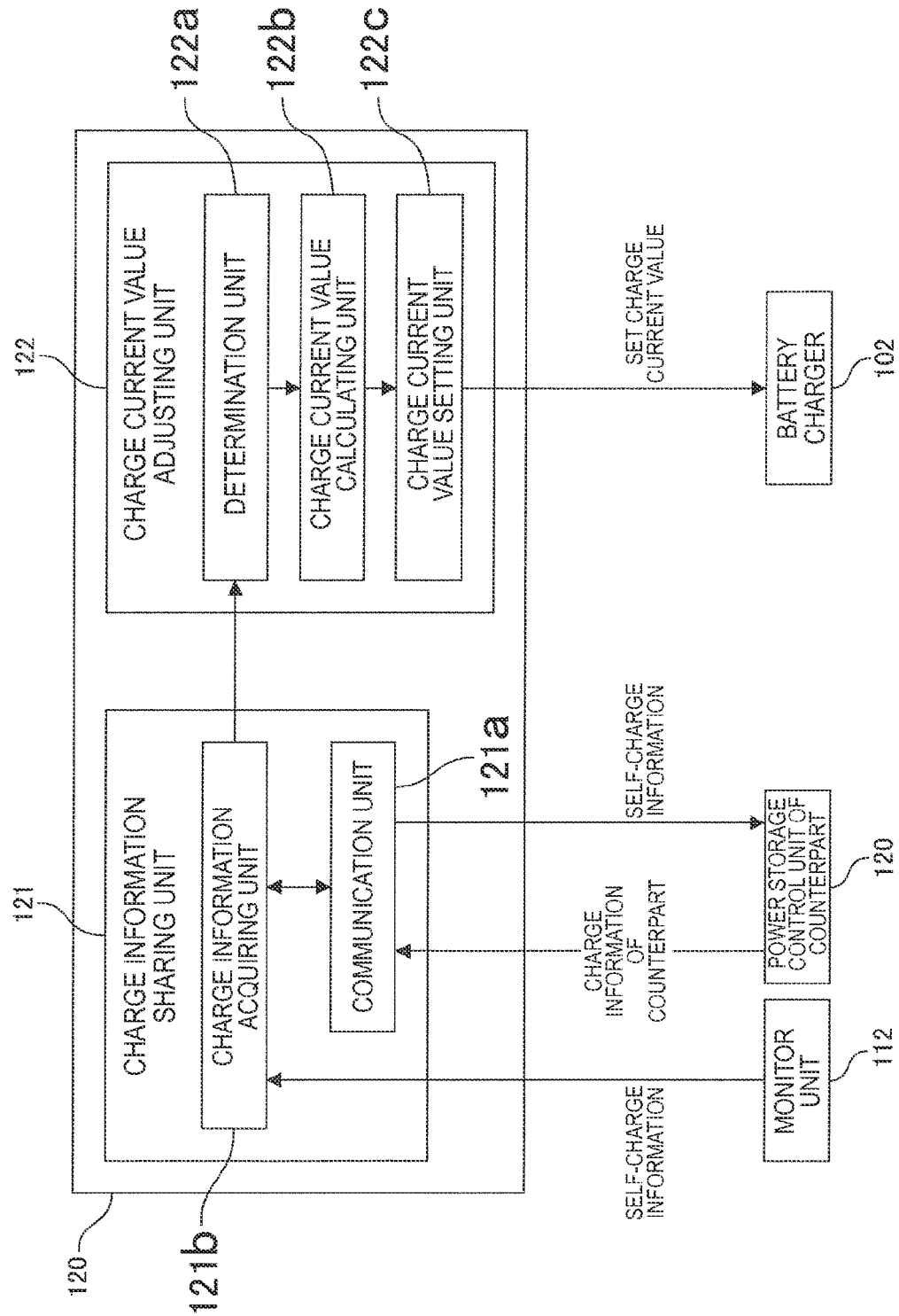
FIG. 8 schematically shows a configuration example of a power storage control unit in a power storage system according to a fourth embodiment of the present disclosure.

FIG. 8 schematically shows a configuration example of the power storage control unit 120 in the power storage system 100 according to a fourth embodiment of the present disclosure. The power storage system 100 according to this embodiment is fundamentally the same as the power storage system 100 shown in FIG. 6 and is different from the power storage system 100 shown in FIG. 6 only in that the power storage control units 120 share charge information.

The charge information according to an embodiment of the present disclosure can be any information that indicates the charge state. The charge information may be the voltage of the battery unit 110, for example. The power storage control units 120 may share the charge information through communication. In this case, each power storage control unit 120 may acquire the charge information from the corresponding monitor unit 112 and may transmit the acquired charge information mutually. Such sharing of the charge information can also be realized by the configuration example shown in FIG. 8, which will be specifically described below.

As shown in FIG. 8, the power storage control unit 120 includes a charge information sharing unit 121 and a charge current value adjusting unit 122. The charge information sharing unit 121 includes a communication unit 121a and a charge information acquiring unit 121b. The charge current value adjusting unit 122 includes a determination unit 122a, a charge current value calculating unit 122b, and a charge current value setting unit 122c.

The charge information sharing unit 121 causes the charge information acquiring unit 121b to acquire charge information (hereinafter referred to as self-charge information) from the monitor unit 112 corresponding to the charge information sharing unit 121. At this time, the self-charge information may be acquired through communication via the signal line 105. The charge information sharing unit 121 causes the communication unit 121a to transmit the self-charge information to the power storage control unit 120 of the counterpart, i.e., the power storage control unit 120 with which the self-charge information is shared. Further, the charge information sharing unit 121 receives, with the communication unit 121a, charge information of the counterpart, the charge information being transmitted from the power storage control unit 120 of the counterpart. The communication unit 121a may transmit and receive the charge information through wired communication or wireless communication. The charge information sharing unit 121 causes the charge information acquiring unit 121b to acquire the charge information received by the communication unit 121a. In this manner, the charge information of the battery units 110 may be shared.

The charge current value adjusting unit 122 causes the determination unit 122a to determine whether or not the charge state of each of the battery units 110 indicated in the shared charge information is a charge state that is to decrease the charge current value. Examples of the charge state that is to decrease the charge current value include that the voltage of one of the battery units 110 has reached the specific voltage value, and the like. The determination unit 122a may determine whether or not the charge state of each of the battery units 110 is a charge state that is to increase the charge current value.

In a case in which the determination unit 122a determines that the charge state of each of the battery units 110 is the charge state that is to decrease the charge current value, the charge current value adjusting unit 122 causes the charge current value calculating unit 122b to calculate the charge current value that is to be set for the battery charger 102. The charge current value calculating unit 122b may calculate the charge current value in accordance with an algorism that is set in advance. The charge current value calculating unit 122b may calculate the charge current value also in a case in which the determination unit 122a determines that the charge current value is to be increased.

The charge current value adjusting unit 122 causes the charge current value setting unit 122c to set the charge current value, calculated by the charge current value calculating unit 122b, for the battery charger 102. Thus, the charge current value adjusting unit 122 decreases the charge current value of the battery charger 102. Operation examples of the charge current value adjusting unit 122 may include the maintenance of the charge current value and the increase in the charge current value.

The charge information sharing unit 121 and the charge current value adjusting unit 122 can be realized by either hardware or software, or both. The charge information sharing unit 121 and the charge current value adjusting unit 122 may be realized by new software mounted on an existing power storage control unit. Thus, new hardware does not need to be added, and accordingly, the cost can be suppressed.

Operation Example of System

Figure 9:
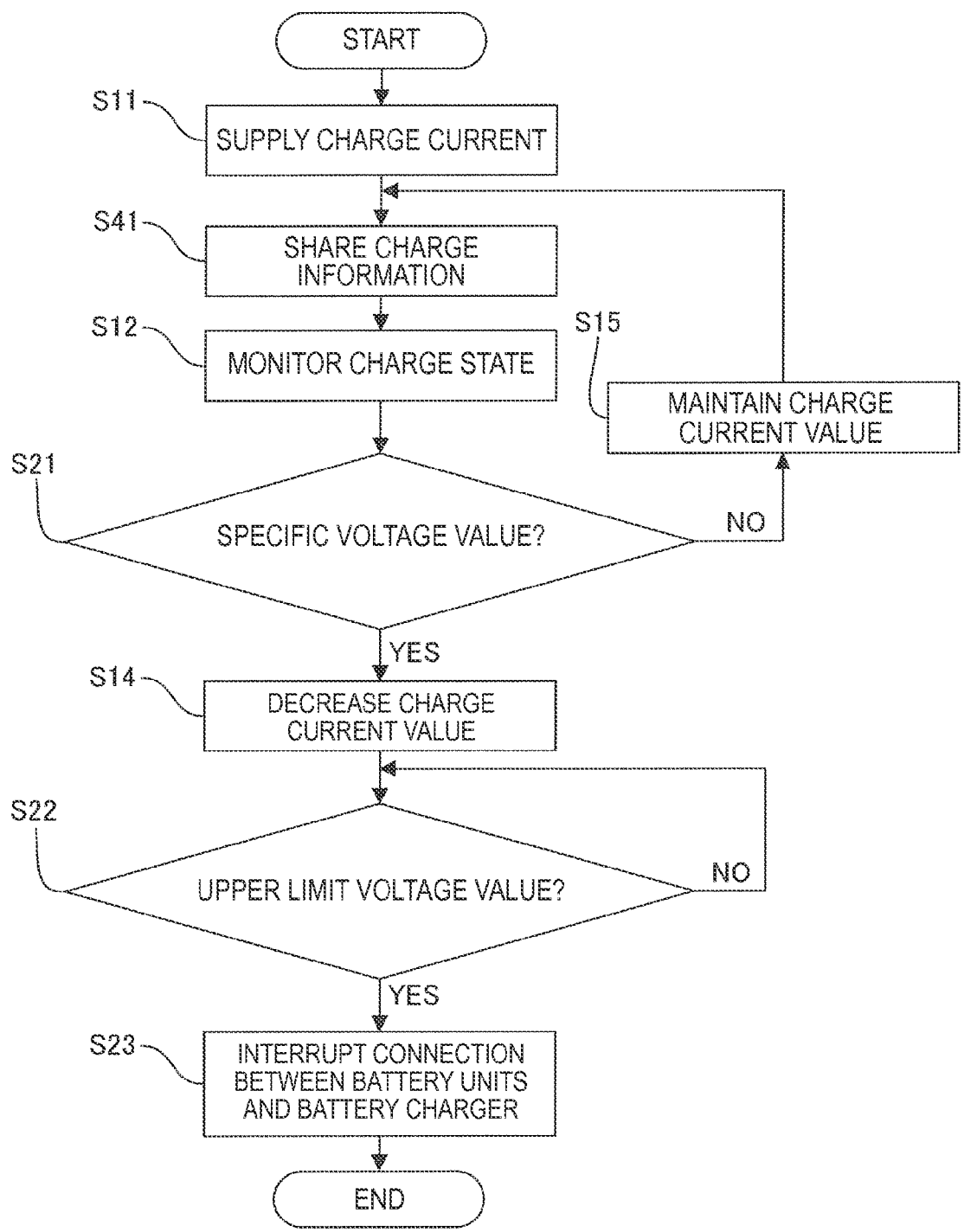
FIG. 9 is a flowchart showing an operation example of a power storage system according to the fourth embodiment of the present disclosure.

FIG. 9 is a flowchart showing an operation example of the power storage system 100 according to this embodiment. The operation example shown in FIG. 9 includes an embodiment of a power storage control method according to an embodiment of the present disclosure. A unique step in the operation example according to this embodiment is step 41 (S41) shown in FIG. 9, executed between the step 11 (S11) and the step 12 (S12).

In the step 41 (S41), the power storage control unit 120 causes the charge information to be shared. The details of the step 41 (S41) are shown in FIG. 10.

Figure 10:
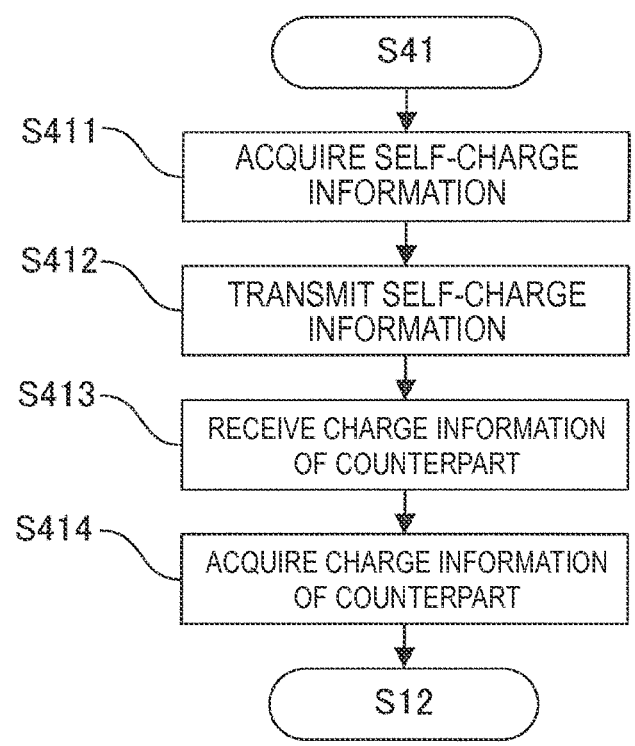
FIG. 10 is a flowchart showing a specific example of a part of a process of the flowchart shown in FIG. 9.

In the step 41 (S41), first, in step 411 (S411) shown in FIG. 10, the self-charge information is acquired from the monitor unit 112.

Next, in step 412 (S412), the self-charge information acquired in the step 411 (S411) is transmitted to the power storage control unit 120 of the counterpart.

Next, in step 413 (S413), the charge information of the counterpart is received.

Next, in step 414 (S414), the charge information of the counterpart, received in the step 413 (S413), is acquired, and the process goes to the step 12 (S12).

According to this embodiment, it is possible to produce the same effects as those of the power storage system 100 shown in FIG. 6, and to adjust the charge current value easily and appropriately on the basis of the charge information of each of the battery units 110. Accordingly, it becomes possible to prevent overcurrent more surely.

7. First Modification Example of Fourth Embodiment

Figure 11:
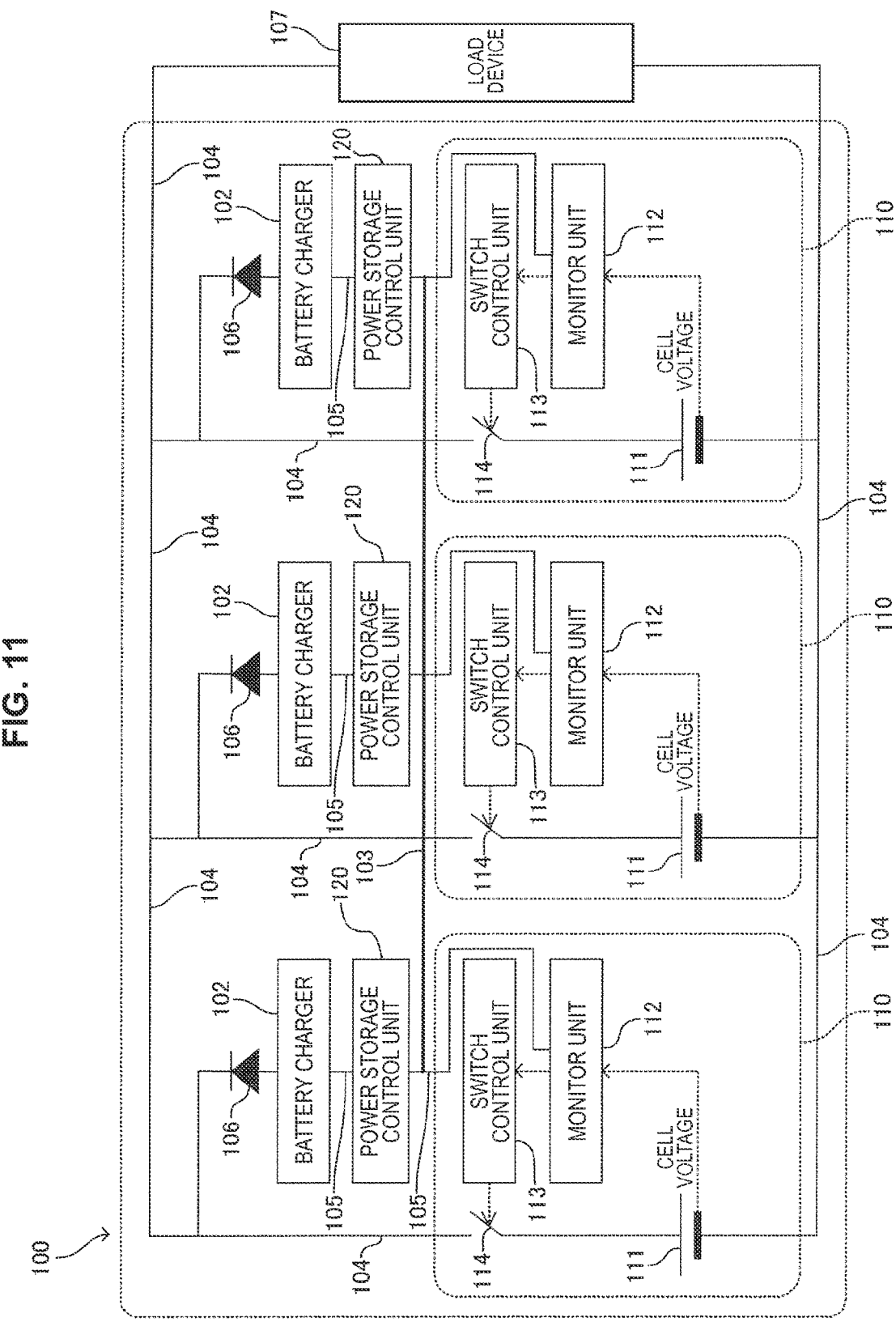
FIG. 11 schematically shows a configuration of a power storage system according to a first modification example of the fourth embodiment of the present disclosure.

FIG. 11 schematically shows a whole configuration of the power storage system 100 according to a first modification example of this embodiment. The power storage system 100 according to this modification example includes a communication line 103. The other configuration and operation are fundamentally the same as those of the power storage system 100 shown in FIG. 8.

As shown in FIG. 11, the power storage control units 120 are mutually connected via the communication line 103. The power storage control units 120 can mutually communicate via the communication line 103. The communication line 103 may be configured in various manners without limitation. For example, the communication line 103 may be a communication line for bidirectional communication. The communication line for bidirectional communication may be a bus such as a serial bus or a parallel bus. The serial bus may be a controller area network (CAN) bus or the like. The use of the CAN bus can stabilize data communication between or among the power storage control units 120.

As shown in FIG. 11, the power storage system 100 may include diodes 106. In the example shown in FIG. 11, two or more diodes 106 are provided for the respective battery chargers 102. An anode of the diode 106 is connected to the battery charger 102 corresponding to the diode 106. A cathode of the cathode 106 is connected to the battery unit 110 corresponding to the diode 106. The diode 106 prevents backward current from flowing from the battery units 110 side to the battery chargers 102.

In the power storage system 100, a load device 107 is connected in parallel via the power line 104. The load device 107 is supplied with power from each of the battery units 110 when the battery units 110 discharge electricity.

According to this modification example, it becomes possible to produce the same effects as those of the power storage system 100 shown in FIG. 8, and to share the charge information via the communication line 103 between two or more power storage control units 120 at a low cost. Accordingly, it becomes possible to prevent overcurrent at a low cost.

8. Second Modification Example of Fourth Embodiment

Figure 12:
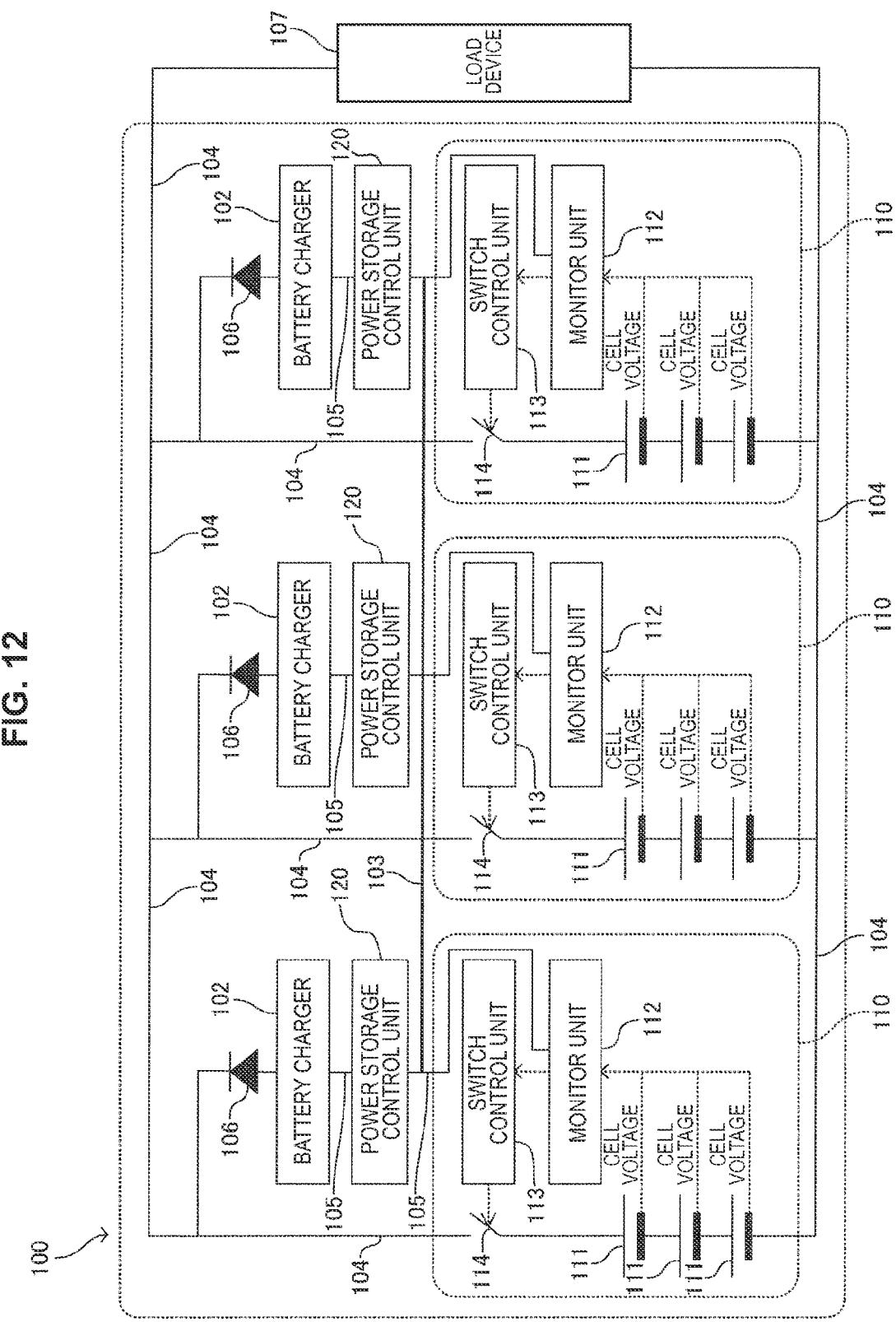
FIG. 12 schematically shows a configuration of a power storage system according to a second modification example of the fourth embodiment of the present disclosure.

FIG. 12 schematically shows a whole configuration of the power storage system 100 according to a second modification example of this embodiment. The power storage system 100 according to this modification example is different from the power storage system 100 shown in FIG. 11 in that each of the battery units 110 includes a plurality of the cells 111. The other configuration and operation are fundamentally the same as those of the power storage system 100 shown in FIG. 11

According to the power storage system 100 according to this modification example, it becomes possible to produce the same effects as those of the power storage system 100 shown in FIG. 11 and to increase the output of the power storage system 100. Further, it becomes possible to prevent overcurrent effectively even when the provision of the plurality of cells 111 for each of the battery units 110 makes it easier to generate variation in the charge state in the battery units 110.

9. Third Modification Example of Fourth Embodiment

Figure 13:
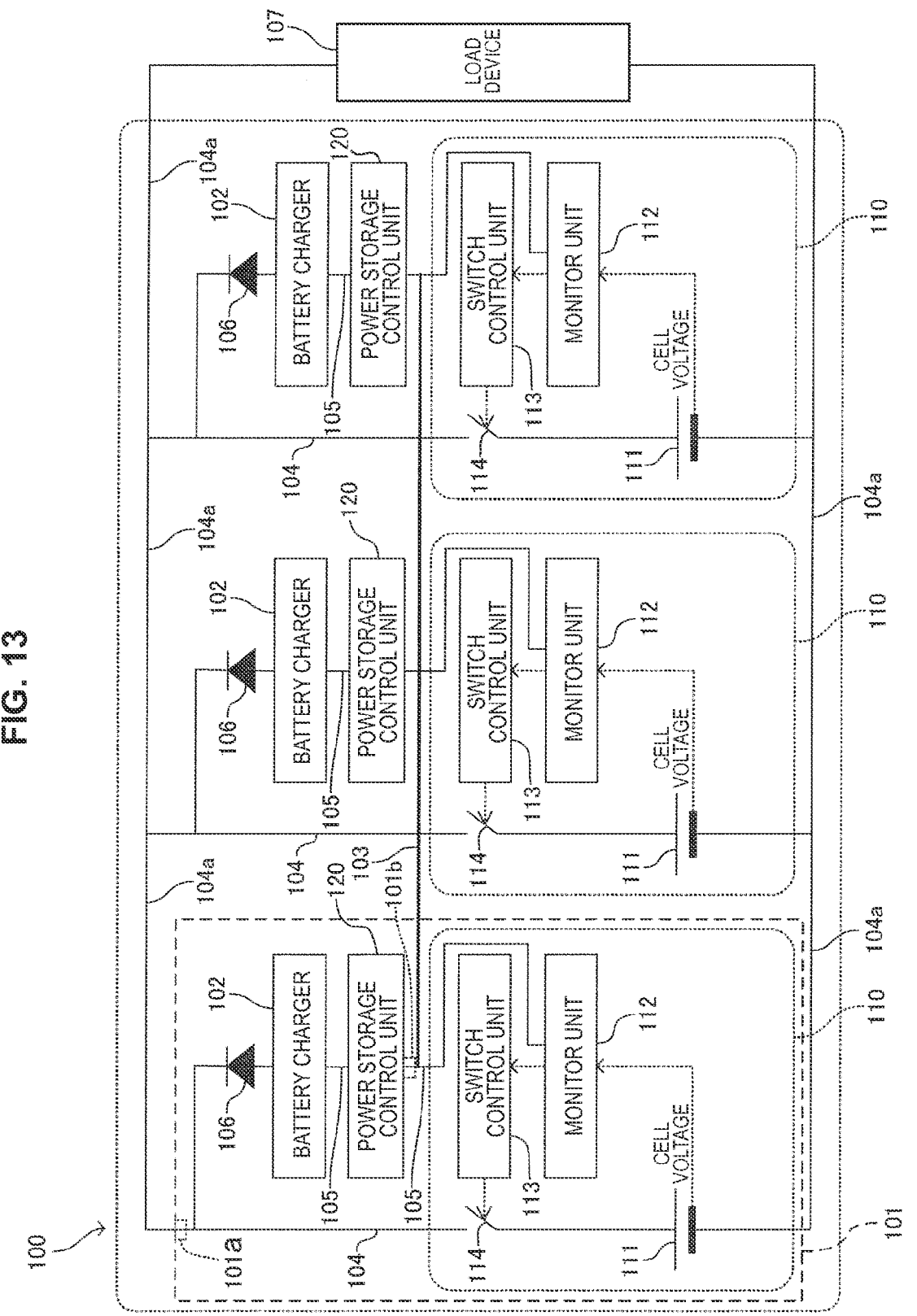
FIG. 13 schematically shows a configuration of a power storage system according to a third modification example of the fourth embodiment of the present disclosure.

FIG. 13 schematically shows a whole configuration of the power storage system 100 according to a third modification example of this embodiment. The power storage system 100 according to this modification example is different from the power storage system 100 shown in FIG. 11 in that the battery unit 110 and the corresponding battery charger 102, the corresponding power storage control unit 120, and the corresponding diode 106 are contained in the same container to form one power storage unit 101. FIG. 13 shows representatively only one power storage unit 101. The other configuration and operation are fundamentally the same as those of the power storage system 100 shown in FIG. 11.

In this modification example, a portion 104a which is used for parallel connection in the power line 104 may be detachably attached to the power storage unit 101 via a terminal portion 101a which is in conduction with the battery unit 111. The communication line 103 may also be detachably attached to the power storage unit 101 via a terminal portion 101b which is in conduction with the power storage control unit 120. The terminal portions 101a and 101b can be configured in various manners without limitation in terms of the position, the number, the structure, and the like.

According to this modification example, it becomes possible to produce the same effects as those of the power storage system 100 shown in FIG. 11. Further, the addition of the power storage unit 101 can increase the output of the power storage system 100 easily.

10. Fifth Embodiment

[Power Storage Control Unit 120]

The power storage system 100 according to this embodiment is different from that in the fourth embodiment in that the power storage control unit 120 performs adjustment of the charge current value in accordance with the number of the battery units 110 having voltages that are higher than or equal to the specific voltage value. The other configuration and operation are fundamentally the same as those in the fourth embodiment.

Here, "adjustment of the charge current value in accordance with the number of the battery units 110 having voltages that are higher than or equal to the specific voltage value" may include a decrease in the charge current value as the number is larger. As an example of such adjustment, the power storage control unit 120 may decrease the charge current value as the number is larger on the condition that the number of the battery units 110 having voltages that are higher than or equal to the specific voltage value is smaller than a predetermined number. In this case, the power storage control unit 120 may keep the same charge current value regardless of the number on the condition that the number of the battery units 110 having voltages that are higher than or equal to the specific voltage value is larger than or equal to the predetermined number. As another example, the power storage control unit 120 may decrease the charge current value as the number of the battery units 110 having voltages that are higher than or equal to the specific voltage value is larger on the condition that a voltage drop of the battery units 110 during charge due to a discharge to a load device 107, for example, is not detected. In this case, the power storage control unit 120 may maintain or increase the charge current value regardless of the number of the battery units 110 having voltages that are higher than or equal to the specific voltage value on the condition that a voltage drop of the battery units 110 during charge is detected.

Here, to "decrease the charge current value as the number of the battery units 110 having voltages that are higher than or equal to the specific voltage value is larger" may be to decrease the charge current value gradually as the number increases. As an example of such adjustment, for example, the power storage control unit 120 may decrease the charge current value gradually as the number increases on the condition that the number of the battery units 110 having voltages that are higher than or equal to the specific voltage value is smaller than a predetermined number. In this case, the power storage control unit 120 may keep the same charge current value regardless of the number on the condition that the number of the battery units 110 having voltages that are higher than or equal to the specific voltage value is larger than or equal to the predetermined number.

As another example, the power storage control unit 120 may decrease the charge current value gradually as the number of the battery units 110 having voltages that are higher than or equal to the specific voltage value increases on the condition that a voltage drop of the battery units 110 during charge is not detected. In this case, the power storage control unit 120 may maintain or increase the charge current value regardless of the number of the battery units 110 having voltages that are higher than or equal to the specific voltage value on the condition that a voltage drop of the battery units 110 during charge is detected.

Operation Example of System

The power storage control unit 120 may control the charge current value supplied to the battery charger 102 in accordance with the following formulas (1) and (2).

$$Iin = (Ic/N) \times (N-M) \text{ (wherein } M<N\text{)} \quad (1)$$

$$Iin = Ic/N \text{ (wherein } M=N\text{)} \quad (2)$$

In the formulas (1) and (2), Iin represents the charge current value, Ic represents the constant current value in constant current charge, and N represents the number of the battery units 110 of which charge is detected. In a case in which all of the battery units 110 are charged, N is equal to the number of parallel connections of the battery units 110. Note that M represents the number of the battery units 110 having voltages that are higher than or equal to the specific voltage value.

[Time Chart]

An example of the control of the charge current value, performed by the power storage control unit 120, in accordance with the formulas (1) and (2) will be shown in time charts shown in FIGS. 14A to 14C.

Note that FIGS. 14A to 14C show time charts of three battery units 110 on the assumption that N=3. In the following description, the battery unit 110 corresponding to the time chart shown in FIG. 14A is defined as a first battery unit 110, and the battery charger 102 corresponding to the first battery unit 110 is defined as a first battery charger 102. Further, the battery unit 110 corresponding to the time chart shown in FIG. 14B is defined as a second battery unit 110, and the battery charger 102 corresponding to the second battery unit 110 is defined as a second battery charger 102. Furthermore, the battery unit 110 corresponding to the time chart shown in FIG. 14C is defined as a third battery unit 110, and the battery charger 102 corresponding to the third battery unit 110 is defined as a third battery charger 102.

The horizontal axis in FIGS. 14A to 14C represents time (t) and the vertical axis in FIGS. 14A to 14C represents charge current values (I1 to I3) flown in the respective battery units 110 and voltages (V1 to V3) of the respective battery units 110.

Here, as shown in FIGS. 14A to 14C, since M=0 from when charge of the first to third battery units 110 starts until time T1 when it is detected that voltage of one of the battery units 110 becomes the specific voltage value (SV) first, Iin=Ic is set from the formula (1). Thus, during a period from the start of charge until time T1, the constant current value Ic is supplied by each of the battery chargers 102 and constant current charge is performed. Note that, in the example shown in FIGS. 14A to 14C, the first battery unit 110 (FIG. 14A) is detected first as the one of the battery units 110 having the specific voltage value.

Next, at time T1, since the voltage of the first battery unit 110 reaches the specific voltage value, M is incremented by 1 (M=1). Thus, in accordance with the formula (1), Iin=(⅔)Ic is set. Accordingly, from time T1 until a new stage to decrease the charge current value, (⅔)Ic is supplied by each of the battery chargers 102.

After that, at time t2, the voltage of the first battery unit 110 reaches the upper limit voltage value (ULV). Thus, the connection between the first battery unit 110 and the first battery charger 102 is interrupted by a switch control of the switch control unit 113, and charge current does not flow to the first battery unit 110. The charge current (⅔)Ic of the first battery charger 102 loses the destination due to the interruption and flows to the second and third battery units 110. At this time, when electrical circuits of the second and third battery units 110 have the same possibility of flow of cross current to an electrical circuit, such as the same impedance or the same internal resistance, the cross current (⅔)Ic from the first battery charger 102 is separated into (⅓)Ic and (⅓)Ic, which flow to the second battery unit 110 and the third battery unit 110, respectively. Note that such shunt current is just an example, and does not limit the scope of the present disclosure.

The cross current from the first battery charger 102 increases the charge current flown to the second and third battery units 110. However, since the charge current value of each of the first to third battery chargers 102 is decreased to (⅔)Ic in advance, the charge current flown to each of the second and third battery units 110 becomes Ic even when the cross current of (⅓)Ic is added. Accordingly, the cross current from the first battery charger 102 does not cause current exceeding Ic, i.e., overcurrent, to flow to the second and third battery units 110.

After that, at time T3, the voltage of the second battery unit 110 (FIG. 14B) reaches the specific voltage value. Further, since the voltage of the first battery unit 110 has become the upper limit voltage value, M is incremented (M=2). Thus, Iin=(⅓)Ic is set in accordance with the formula (1). Thus, after time T3, (⅓)Ic is supplied by each of the battery chargers 102. At this time, the charge current value flown to each of the second and third battery units 110 becomes (½)Ic because the cross current (⅓)Ic from the first battery charger 102 is assigned uniquely by (⅙)Ic.

After that, at time T4, the voltage of the second battery unit 110 reaches the upper limit voltage value. Thus, the connection between the second battery unit 110 and the second battery charger 102 is interrupted and the charge current does not flow to the second battery unit 110. The charge current of the second battery charger 102 loses the destination due to the interruption and flows to the third battery unit 110. At this time, the charge current of the first battery charger 102 also flows to the third battery unit 110.

The cross current from the first and second battery chargers 102 increases the charge current flown to the third battery unit 110. However, since the charge current value of each of the first to third battery chargers 102 is decreased to (⅓)Ic in advance, the charge current flown to the third battery unit 110 becomes Ic even when the cross current of (⅓)Ic is added. Accordingly, the cross current from the first and second battery chargers 102 does not cause overcurrent exceeding Ic to flow to the third battery unit 110.

After that, at time T5, the voltage of the third battery unit 110 (FIG. 14C) reaches the specific voltage value. Further, since the voltage of each of the first and second battery units 110 has become the upper limit voltage value, M is incremented (M=3). At this time, since M=N, Iin=(⅓)Ic is set in accordance with the formula (2) instead of the formula (1). Thus, after time T5, (⅓)Ic is continuously set, that is, maintained, for each of the battery chargers 102, and Ic is supplied to the third battery unit 110 also from when the voltage thereof exceeds the specific voltage value until the end of charge.

The control of the charge current value shown in FIGS. 14A to 14C is an example of adjustment of the charge current value in accordance with the number of the battery units 110 having voltages higher than or equal to the specific voltage value. Specifically, the control of the charge current value shown in FIGS. 14A to 14C is an example of adjust-ment including decreasing the charge current value as the number of the battery units 110 having voltages higher than or equal to the specific voltage value is larger. More specifically, the control of the charge current value shown in FIGS. 14A to 14C is an example of adjustment including decreasing the charge current value gradually as the number of the battery units 110 having voltages higher than or equal to the specific voltage value increases.

[Flowchart]

Next, an operation example of the whole system is shown in a flowchart of FIG. 15. The operation example shown in FIG. 15 is different from that in FIG. 9 in that step 51 (S51) to step 55 (S55) are executed between the step 12 (S12) and the step 22 (S22).

In the step 51 (S51), the power storage control unit 120 determines whether or not M in the formulas (1) and (2) is increased. In a case in which the determination result is affirmative in the step 51 (S51), the process goes to the step 52 (S52); in a case in which the determination result is negative, the process goes to the step 15 (S15).

In the step 52 (S52), the power storage control unit 120 determines whether or not the magnitude of M and N in the formulas (1) and (2) is M<N. In a case in which the determination result is affirmative in the step 52 (S52), the process goes to the step 53 (S53); in a case in which the determination result is negative, that is, M=N, the process goes to the step 54 (S54).

In the step 53 (S53), the power storage control unit 120 calculates the charge current value by substituting M and N in the formula (1), and the process goes to the step 55 (S55).

In the step 54 (S54), the power storage control unit 120 calculates the charge current value by substituting M and N in the formula (2), and the process goes to the step 55 (S55).

In the step 55 (S55), the power storage control unit 120 sets the charge current value for the battery chargers 102, the charge current value being obtained by calculation in the step 53 (S53) or the step 54 (S54), and the process goes to the step 22 (S22).

In addition, in the operation example shown in FIG. 15, step 56 (S56) is executed after the step 23 (S23). In the step 56 (S56), the power storage control unit 120 determines whether or not the conditions for terminating control of the battery chargers 102 are satisfied. In other words, in the step 56 (S56), it is determined whether or not an event to terminate the control of the battery chargers 102 is detected. The conditions or the event in this step may be, for example, failure of detection of the battery unit 110 during charge. In a case in which the determination result is affirmative in the step 56 (S56), the process is terminated; in a case in which the determination result is negative, the process is returned to the step 41 (S41).

According to the power storage system 100 of this embodiment, it becomes possible to produce the same effects as those in the fourth embodiment, and to perform adjustment of the charge current value preferably in accordance with the number M of the factors of generation of overcurrent. Further, according to this embodiment, it becomes possible to decrease the charge current value gradually in accordance with a sequential increase in the factors of generation of overcurrent, and accordingly, it becomes possible to cope with the change in the charge state flexibly.

11. Modification Example of Fifth Embodiment

In the time charts shown in FIGS. 14A to 14C, M is incremented one by one, and the charge of the battery units 110 is terminated one by one. The formula (1) can cope with, not only such sequential termination of charge, but also simultaneous termination of charge.

For example, as shown FIGS. 16A to 16C, it is assumed that, at time T1, the voltage of each of the first and second battery units 110 becomes the specific voltage value (SV) simultaneously. In this case, since M becomes 2 (M=2) at this time, the charge current value can be set to (⅓)Ic from the formula (1).

On the other hand, FIGS. 17A to 17C show time charts in a case in which the charge current value is not decreased in accordance with the charge state, unlike in the present disclosure. As shown in FIGS. 17A to 17C, in a case in which the charge current value of the battery chargers is not decreased, every time the connection between the battery unit and the battery charger is interrupted, the cross current from the battery charger boosts the charge current flown to the other battery units to be higher than or equal to the constant current value and generates overcurrent. The overcurrent becomes more obvious as the number of the interrupted connections between the battery units and the battery chargers increases.

In the examples shown in FIGS. 14A to 14C and FIGS. 16A to 16C, in a case in which the number of the battery units 110 having voltages higher than or equal to the specific voltage value increases, the charge current value of the respective battery chargers 102 is set to an equal value. However, the present disclosure is not limited to this. For example, in a case in which the constant current value is different in the constant current charge of the respective battery chargers 102 or in which the possibility of flow of the cross current to the respective battery chargers 102 differs, different charge current values may be set for the respective battery chargers 102.

The above described embodiments and modification examples may be combined as appropriate.

The effects described in the above embodiments and modification examples are just explanatory or exemplary effects, and are not limiting. That is, other effects may be produced, and it is acceptable that the present disclosure exhibits any one of the plurality of effects described in the above embodiments and modification examples.

Additionally, the present technology may also be configured as below.

(1) A power storage system including:
  at least two battery units mutually connected in parallel, the battery units each including
    at least one cell, and
    at least one monitor device configured to monitor a charge state;
  at least one battery charger configured to supply charge current to each of the battery units; and
  at least one power storage control device configured to control a charge current value that is supplied to each of the battery units,
  wherein the power storage control device is configured to decrease the charge current value in accordance with the charge state of each of the battery units.

(2) The power storage system according to (1),
  wherein each of the battery units includes
    an interruption device configured to interrupt connection with the battery charger in a case in which a voltage reaches an upper limit voltage value, and
  wherein the power storage control device is configured to decrease the charge current value in a case in which a voltage of any one of the battery units becomes a specific voltage value that is smaller than the upper limit voltage value.

(3) The power storage system according to (2),
  wherein, until it is detected that the voltage of one of the battery units becomes the specific voltage value first, the power storage control device keeps causing the battery charger to supply a constant current, and after it is detected that the voltage of one of the battery units becomes the specific voltage value first, the power storage control device adjusts a current value that is supplied by the battery charger in a manner that the charge current value that is supplied to each of the battery units is set to be lower than or equal to the constant current value.

(4) The power storage system according to any one of (1) to (3), including:
  at least two power storage control devices,
  wherein the at least two power storage control devices share charge information.

(5) The power storage system according to (4),
  wherein the power storage system is configured to share the charge information through communication.

(6) The power storage system according to (5), further including:
  a communication line that mutually connects the at least two power storage control devices,
  wherein the at least two power storage control devices are each configured to mutually transmit and receive the charge information via the communication line.

(7) The power storage system according to (5) or (6),
  wherein a first power storage control device out of the at least two power storage control devices is configured to acquire the charge information from the monitor device corresponding to the first power storage control device and transmit the charge information to a second power storage control device out of the at least two power storage control devices.

(8) The power storage system according to (2) or (3),
  wherein the power storage control device is configured to perform adjustment of the charge current value in accordance with a number of the battery units having voltages that are higher than or equal to the specific voltage value.

(9) The power storage system according to (8),
  wherein the power storage control device is configured to perform the adjustment including decreasing the charge current value as the number of the battery units having voltages that are higher than or equal to the specific voltage value is larger.

(10) The power storage system according to (9),
  wherein the power storage control device is configured to perform the adjustment including decreasing the charge current value gradually as the number of the battery units having voltages that are higher than or equal to the specific voltage value increases.

(11) A power storage control method including:
  decreasing a charge current value that is supplied to at least two battery units in accordance with a charge state of each of the battery units, the battery units being mutually connected in parallel and each including at least one cell.

(12) The power storage method according to (11),
  wherein connection between each of the battery units and the battery charger is interrupted in a case in which a voltage reaches an upper limit voltage value, and
  wherein the charge current value is decreased in a case in which a voltage of any one of the battery units becomes a specific voltage value that is smaller than the upper limit voltage value.

(13) The power storage method according to (12),
wherein, until it is detected that the voltage of one of the battery units becomes the specific voltage value first, the battery charger is kept being caused to supply a constant current, and after it is detected that the voltage of one of the battery units becomes the specific voltage value first, a current value that is supplied by the battery charger is adjusted in a manner that the charge current value that is supplied to each of the battery units is set to be lower than or equal to the constant current value.

(14) The power storage method according to (12) or (13),
wherein adjustment of the charge current value is performed in accordance with a number of the battery units having voltages that are higher than or equal to the specific voltage value.

(15) The power storage method according to (14),
wherein the adjustment including decreasing the charge current value as the number of the battery units having voltages that are higher than or equal to the specific voltage value is larger is performed.

(16) The power storage method according to (15),
wherein the adjustment including decreasing the charge current value gradually as the number of the battery units having voltages that are higher than or equal to the specific voltage value increases is performed.

(17) A power storage control program for causing a computer to function as:
means for decreasing a charge current value supplied to at least two battery units mutually connected in parallel, the battery units each including at least one cell, in accordance with a charge state of each of the battery units.

(18) A power storage unit including:
a battery unit including
at least one cell, and
at least one monitor device configured to monitor a charge state;
a battery charger configured to supply charge current to the battery unit; and
a power storage control device configured to control a charge current value that is supplied to the battery unit,
wherein the power storage control device is configured to decrease the charge current value in accordance with the charge state of the battery unit and a charge state of a battery unit that is connected to the battery unit in parallel.

Although the preferred embodiments of the present disclosure have been described in detail with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. A power storage system comprising:
at least two battery units mutually connected in parallel, the battery units each including:
at least one cell; and
at least one monitor device configured to monitor a charge state;
at least one battery charger configured to supply charge current to each of the battery units; and
at least one power storage control device configured to control a charge current value that is supplied to each of the battery units,
wherein the power storage control device is configured to decrease the charge current value in accordance with the charge state of each of the battery units,
wherein each of the battery units includes an interruption device configured to interrupt connection with the battery charger in a case in which a voltage reaches an upper limit voltage value,
wherein the power storage control device is configured to decrease the charge current value in a case in which a voltage of any one of the battery units becomes a specific voltage value that is smaller than the upper limit voltage value, and
wherein, until it is detected that the voltage of one of the battery units becomes the specific voltage value first, the power storage control device keeps causing the battery charger to supply a constant current, and after it is detected that the voltage of one of the battery units becomes the specific voltage value first, the power storage control device adjusts a current value that is supplied by the battery charger in a manner that the charge current value that is supplied to each of the battery units is set to be lower than or equal to the constant current value.

2. The power storage system according to claim 1, comprising:
at least two power storage control devices,
wherein the at least two power storage control devices share charge information.

3. The power storage system according to claim 2, further comprising:
a communication line that mutually connects the at least two power storage control devices,
wherein the at least two power storage control devices are each configured to mutually transmit and receive the charge information via the communication line.

4. The power storage system according to claim 2,
wherein a first power storage control device out of the at least two power storage control devices is configured to acquire the charge information from the monitor device corresponding to the first power storage control device and transmit the charge information to a second power storage control device out of the at least two power storage control devices.

5. A power storage system comprising:
at least two battery units mutually connected in parallel, the battery units each including:
at least one cell; and
at least one monitor device configured to monitor a charge state;
at least one battery charger configured to supply charge current to each of the battery units; and
at least one power storage control device configured to control a charge current value that is supplied to each of the battery units,
wherein the power storage control device is configured to decrease the charge current value in accordance with the charge state of each of the battery units,
wherein each of the battery units includes an interruption device configured to interrupt connection with the battery charger in a case in which a voltage reaches an upper limit voltage value,
wherein the power storage control device is configured to decrease the charge current value in a case in which a voltage of any one of the battery units becomes a specific voltage value that is smaller than the upper limit voltage value, and
wherein the power storage control device is configured to perform adjustment of the charge current value in accordance with a number of the battery units having voltages that are higher than or equal to the specific voltage value.

6. The power storage system according to claim 5, wherein the power storage control device is configured to perform the adjustment including decreasing the charge current value as the number of the battery units having voltages that are higher than or equal to the specific voltage value is larger.

7. The power storage system according to claim 6, wherein the power storage control device is configured to perform the adjustment including decreasing the charge current value gradually as the number of the battery units having voltages that are higher than or equal to the specific voltage value increases.

8. A power storage control device comprising:

a configuration configured to decrease a charge current value that is supplied to at least two battery units in accordance with a charge state of each of the battery units, the battery units being mutually connected in parallel and each including at least one cell, wherein the power storage control device is configured to decrease the charge current value in a case in which a voltage of any one of the battery units becomes a specific voltage value, and wherein the power storage control device is configured to perform adjustment of the charge current value in accordance with a number of the battery units having voltages that are higher than or equal to the specific voltage value.

9. The power storage control device according to claim 8, wherein the power storage control device is configured to perform the adjustment including decreasing the charge current value as the number of the battery units having voltages that are higher than or equal to the specific voltage value is larger.

10. The power storage control device according to claim 9, wherein the power storage control device is configured to perform the adjustment including decreasing the charge current value gradually as the number of the battery units having voltages that are higher than or equal to the specific voltage value increases.

* * * * *